US012743470B2

(12) United States Patent
Goyal et al.

(10) Patent No.: US 12,743,470 B2
(45) Date of Patent: Sep. 22, 2026

(54) PARTIAL FINGERPRINT MASKING FOR PATTERN SEARCHING

(71) Applicant: Automation Anywhere, Inc., San Jose, CA (US)

(72) Inventors: Ranjna Garg Goyal, Santa Clara, CA (US); Niraj Radhakrishnan Kunnumma, Bengalura (IN)

(73) Assignee: AUTOMATION ANYWHERE, INC., San Jose, CA (US)

( * ) Notice: Subject to any disclaimer, the term of this patent is extended or adjusted under 35 U.S.C. 154(b) by 1240 days.

(21) Appl. No.: 17/537,468

(22) Filed: Nov. 29, 2021

(65) Prior Publication Data

US 2023/0169120 A1 Jun. 1, 2023

(51) Int. Cl.
*G06F 16/903* (2019.01)
*G05B 19/4155* (2006.01)

(52) U.S. Cl.
CPC ... *G06F 16/90335* (2019.01); *G05B 19/4155* (2013.01); *G05B 2219/37605* (2013.01); *G05B 2219/50391* (2013.01)

(58) Field of Classification Search
CPC .......... G06F 16/90335; G05B 19/4155; G05B 2219/37605; G05B 2219/50391
USPC .......................................................... 707/769
See application file for complete search history.

(56) References Cited

U.S. PATENT DOCUMENTS 5,949,999 A 9/1999 Song et al.
5,983,001 A 11/1999 Boughner et al.
6,133,917 A 10/2000 Feigner et al.
6,226,407 B1 5/2001 Zabih et al.
6,389,592 B1 5/2002 Ayres et al.
6,427,234 B1 7/2002 Chambers et al.
6,473,794 B1 10/2002 Guheen et al.
6,496,979 B1 12/2002 Chen et al.
6,640,244 B1 10/2003 Bowman-Amuah
6,704,873 B1 3/2004 Underwood
6,898,764 B2 5/2005 Kemp
6,954,747 B1 10/2005 Wang et al.
(Continued)

FOREIGN PATENT DOCUMENTS

WO 2019/092672 A2 5/2019
WO 2022/076488 4/2022

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).

(Continued)

*Primary Examiner* — Giovanna B Colan
(74) *Attorney, Agent, or Firm* — Jason A. Smith; Shumaker, Loop & Kendrick, LLP

(57) ABSTRACT

Improved techniques for locating sequences of steps, or patterns, in recordings of user-initiated events with respect to one or more application programs. A digital fingerprint can be formed for each step in a recording by encoding a plurality of attributes for each step in the recording. When operating to locate sequence of steps, or patterns, in the recordings, the digital fingerprint can be modified to allow for less rigid matching of steps. In one embodiment, the digital fingerprint for a given step in a given situation can dynamically generated or modified, such as a request to a server to generate or modify a digital fingerprint.

22 Claims, 19 Drawing Sheets

(56) References Cited

U.S. PATENT DOCUMENTS 6,957,186 B1 10/2005 Guheen et al.
7,091,898 B2 8/2006 Arling et al.
7,246,128 B2 7/2007 Jordahl
7,398,469 B2 7/2008 Kisamore et al.
7,441,007 B1 10/2008 Kirkpatrick et al.
7,533,096 B2 5/2009 Rice et al.
7,568,109 B2 7/2009 Powell et al.
7,571,427 B2 8/2009 Wang et al.
7,765,525 B1 7/2010 Davidson et al.
7,783,135 B2 8/2010 Gokturk
7,805,317 B2 9/2010 Khan et al.
7,805,710 B2 9/2010 North
7,810,070 B2 10/2010 Nasuti et al.
7,846,023 B2 12/2010 Evans et al.
8,028,269 B2 9/2011 Bhatia et al.
8,056,092 B2 11/2011 Allen et al.
8,095,910 B2 1/2012 Nathan et al.
8,132,156 B2 3/2012 Malcolm
8,209,738 B2 6/2012 Nicol et al.
8,234,622 B2 7/2012 Meijer et al.
8,245,215 B2 8/2012 Extra
8,352,464 B2 1/2013 Fotev
8,365,147 B2 1/2013 Grechanik
8,396,890 B2 3/2013 Lim
8,438,558 B1 5/2013 Adams
8,443,291 B2 5/2013 Ku et al.
8,464,240 B2 6/2013 Fritsch et al.
8,498,473 B2 7/2013 Chong et al.
8,504,803 B2 8/2013 Shukla
8,631,458 B1 1/2014 Banerjee
8,682,083 B2 3/2014 Kumar et al.
8,713,003 B2 4/2014 Fotev
8,724,907 B1 5/2014 Sampson et al.
8,769,482 B2 7/2014 Batey et al.
8,819,241 B1 8/2014 Washbum
8,832,048 B2 9/2014 Lim
8,874,685 B1 10/2014 Hollis et al.
8,943,493 B2 1/2015 Schneider
8,965,905 B2 2/2015 Ashmore et al.
8,966,458 B2 2/2015 Asai
9,032,314 B2 5/2015 Mital et al.
9,104,294 B2 8/2015 Forstall et al.
9,171,359 B1 10/2015 Lund
9,213,625 B1 12/2015 Schrage
9,251,413 B2 2/2016 Meler
9,278,284 B2 3/2016 Ruppert et al.
9,444,844 B2 9/2016 Edery et al.
9,462,042 B2 10/2016 Shukla et al.
9,571,332 B2 2/2017 Subramaniam et al.
9,600,519 B2 3/2017 Schoning et al.
9,621,584 B1 4/2017 Schmidt et al.
9,934,063 B2 4/2018 Kaina
9,934,129 B1 4/2018 Budurean
9,946,233 B2 4/2018 Brun et al.
9,965,139 B2 5/2018 Nychis
9,990,347 B2 6/2018 Raskovic et al.
10,015,503 B1 7/2018 Ahammad
10,043,255 B1 8/2018 Pathapati et al.
10,282,280 B1 5/2019 Gouskova
10,489,682 B1 11/2019 Kumar et al.
10,552,540 B2 2/2020 Marascu et al.
10,592,738 B2 3/2020 Northrup
10,654,166 B1 5/2020 Hall
10,706,218 B2 7/2020 Milward et al.
10,706,228 B2 7/2020 Buisson
10,713,068 B1 7/2020 Zohar
10,936,807 B1 3/2021 Walters
11,099,972 B2 8/2021 Puszkiewicz
11,176,443 B1 11/2021 Selva
11,182,178 B1 11/2021 Singh et al.
11,182,604 B1 11/2021 Methaniya
11,243,803 B2 2/2022 Anand et al.
11,263,391 B2 3/2022 Potts
11,348,353 B2 5/2022 Sundell et al.
11,614,731 B2 3/2023 Anand et al.
11,642,783 B2 5/2023 Han et al.
11,775,321 B2 10/2023 Singh et al.
11,775,339 B2 10/2023 Anand et al.
11,775,814 B1 10/2023 Anand et al.
11,782,734 B2 10/2023 Ginoya et al.
11,820,020 B2 11/2023 Goyal et al.
11,954,008 B2 * 4/2024 Kakhandiki ........ G06F 11/3438
2002/0029232 A1 3/2002 Bobrow et al.
2003/0033590 A1 2/2003 Leherbauer
2003/0101245 A1 5/2003 Srinivasan et al.
2003/0114959 A1 6/2003 Sakamoto
2003/0159089 A1 8/2003 DiJoseph
2004/0083472 A1 4/2004 Rao et al.
2004/0153649 A1 8/2004 Rhoads
2004/0172526 A1 9/2004 Tann et al.
2004/0210885 A1 10/2004 Wang et al.
2004/0243994 A1 12/2004 Nasu
2005/0188357 A1 8/2005 Derks et al.
2005/0204343 A1 9/2005 Kisamore et al.
2005/0257214 A1 11/2005 Moshir et al.
2006/0095276 A1 5/2006 Axelrod et al.
2006/0150188 A1 7/2006 Roman et al.
2006/0218110 A1 9/2006 Simske et al.
2007/0030528 A1 2/2007 Quaeler et al.
2007/0089101 A1 4/2007 Romanovskiy
2007/0101291 A1 5/2007 Forstall et al.
2007/0112574 A1 5/2007 Greene
2007/0156677 A1 7/2007 Szabo
2007/0233741 A1 10/2007 Shen
2008/0005086 A1 1/2008 Moore
2008/0027769 A1 1/2008 Eder
2008/0028392 A1 1/2008 Chen et al.
2008/0133052 A1 6/2008 Jones
2008/0209392 A1 8/2008 Able et al.
2008/0222454 A1 9/2008 Kelso
2008/0263024 A1 10/2008 Landschaft et al.
2008/0310625 A1 12/2008 Vanstone et al.
2009/0037509 A1 2/2009 Parekh et al.
2009/0103769 A1 4/2009 Milov et al.
2009/0116071 A1 5/2009 Mantell
2009/0172814 A1 7/2009 Khosravi et al.
2009/0199160 A1 8/2009 Vaitheeswaran et al.
2009/0217309 A1 8/2009 Grechanik et al.
2009/0249297 A1 10/2009 Doshi et al.
2009/0313229 A1 12/2009 Fellenstein et al.
2009/0320002 A1 12/2009 Peri-Glass et al.
2010/0023602 A1 1/2010 Martone
2010/0023933 A1 1/2010 Bryant et al.
2010/0077475 A1 3/2010 Deschenes
2010/0100605 A1 4/2010 Allen et al.
2010/0106671 A1 4/2010 Li et al.
2010/0138015 A1 6/2010 Colombo et al.
2010/0235433 A1 9/2010 Ansari et al.
2010/0251163 A1 9/2010 Keable
2010/0275113 A1 10/2010 Bastos dos Santos
2011/0022578 A1 1/2011 Fotev
2011/0106284 A1 5/2011 Catoen
2011/0145807 A1 6/2011 Molinie et al.
2011/0197121 A1 * 8/2011 Kletter .................. G06F 40/194
715/255
2011/0267490 A1 11/2011 Goktekin
2011/0276568 A1 11/2011 Fotev
2011/0276946 A1 11/2011 Pletter
2011/0302570 A1 12/2011 Kurimilla et al.
2012/0011458 A1 1/2012 Xia et al.
2012/0042281 A1 2/2012 Green
2012/0124062 A1 5/2012 Macbeth et al.
2012/0131456 A1 5/2012 Lin et al.
2012/0143941 A1 6/2012 Kim
2012/0266149 A1 10/2012 Lebert
2012/0324333 A1 12/2012 Lehavi
2012/0330940 A1 12/2012 Caire et al.
2013/0145006 A1 6/2013 Tammam
2013/0173648 A1 7/2013 Tan et al.
2013/0227535 A1 8/2013 Kannan
2013/0236111 A1 9/2013 Pintsov
2013/0290318 A1 10/2013 Shapira et al.
2014/0036290 A1 2/2014 Miyagawa
2014/0045484 A1 2/2014 Kim et al.

(56) References Cited

U.S. PATENT DOCUMENTS

2014/0075371 A1 3/2014 Carmi
2014/0181705 A1 6/2014 Hey et al.
2014/0189576 A1 7/2014 Carmi
2014/0379666 A1 12/2014 Bryon
2015/0082280 A1 3/2015 Betak et al.
2015/0235193 A1 8/2015 Cummings
2015/0301926 A1 10/2015 Giannelos
2015/0310268 A1 10/2015 He
2015/0347284 A1 12/2015 Hey et al.
2016/0019049 A1 1/2016 Kakhandiki et al.
2016/0034441 A1 2/2016 Nguyen et al.
2016/0055376 A1 2/2016 Koduru
2016/0063269 A1 3/2016 Liden
2016/0078368 A1 3/2016 Kakhandiki et al.
2017/0270431 A1 9/2017 Hosabettu
2018/0113781 A1 4/2018 Kim
2018/0210824 A1 7/2018 Kochura
2018/0218429 A1 8/2018 Guo et al.
2018/0275835 A1 9/2018 Prag
2018/0276462 A1 9/2018 Davis
2018/0321955 A1 11/2018 Liu
2018/0322403 A1 11/2018 Ron
2018/0349730 A1 12/2018 Dixon
2018/0370029 A1 12/2018 Hall
2019/0005050 A1 1/2019 Proux
2019/0026215 A1 1/2019 Agarwal
2019/0028587 A1 1/2019 Unitt
2019/0034041 A1 1/2019 Nychis
2019/0095440 A1 3/2019 Chakra
2019/0114370 A1 4/2019 Cerino
2019/0126463 A1 5/2019 Purushothaman
2019/0141596 A1 5/2019 Gay
2019/0188462 A1 6/2019 Nishida
2019/0205636 A1 7/2019 Saraswat
2019/0213822 A1 7/2019 Jain
2019/0250891 A1 8/2019 Kumar
2019/0266692 A1 8/2019 Stach et al.
2019/0317803 A1 10/2019 Maheshwari
2019/0324781 A1 10/2019 Ramamurthy
2019/0340240 A1 11/2019 Duta
2019/0377987 A1 12/2019 Price et al.
2020/0019767 A1 1/2020 Porter et al.
2020/0034976 A1 1/2020 Stone et al.
2020/0059441 A1 2/2020 Viet
2020/0097742 A1 3/2020 Kumar et al.
2020/0104350 A1 4/2020 Allen
2020/0125635 A1 4/2020 Nuolf
2020/0147791 A1 5/2020 Safary
2020/0151444 A1 5/2020 Price et al.
2020/0151591 A1 5/2020 Li
2020/0159647 A1 5/2020 Puszkiewicz
2020/0159648 A1 5/2020 Ghare
2020/0249964 A1 8/2020 Fernandes
2020/0273078 A1 8/2020 Xu
2020/0285353 A1 9/2020 Rezazadeh Sereshkeh
2020/0311210 A1 10/2020 Nama
2020/0334249 A1 10/2020 Canim
2021/0042516 A1 2/2021 Panakkal
2021/0049128 A1 2/2021 Kernick
2021/0107140 A1 4/2021 Singh
2021/0141497 A1 5/2021 Magureanu
2021/0216334 A1 7/2021 Barrett
2021/0279166 A1 9/2021 Peng
2022/0138309 A1* 5/2022 Barnett .................. G06F 21/44
705/75
2022/0197255 A1* 6/2022 Cella .................. G05B 19/4155
2022/0245936 A1 8/2022 Valk
2022/0405094 A1 12/2022 Farquhar
2023/0052190 A1 2/2023 Goyal et al.
2023/0053260 A1 2/2023 Goyal et al.
2023/0083893 A1* 3/2023 Craft ...................... H04L 51/52
707/769
2023/0283604 A1* 9/2023 Griffin .................. H04W 12/06
713/168
2024/0004851 A1* 1/2024 Zhang ................. G06F 16/2358
2024/0281474 A1* 8/2024 Craft ................. G06F 16/90335

OTHER PUBLICATIONS

B.P. Kasper "Remote: A Means of Remotely Controlling and Storing Data from a HAL Quadrupole Gass Analyzer Using an IBM-PC Compatible Computer", Nov. 15, 1995, Space and Environment Technology Center.
Bergen et al., RPC automation: making legacy code releant, May 2013, 6 pages.
Hu et al., Automating GUI testing for Android applications, May 2011, 7 pages.
Konstantinou et al., An architecture for virtual solution composition and deployment in infrastructure clouds, 9 pages (Year: 2009).
Nyulas et al., An Ontology-Driven Framework for Deploying JADE Agent Systems, 5 pages (Year: 2006).
Tom Yeh, Tsung-Hsiang Chang, and Robert C. Miller, Sikuli: Using GUI Screenshots for Search and Automation, Oct. 4-7, 2009, 10 pages.
Yu et al., Deplying and managing Web services: issues, solutions, and directions, 36 pages (Year: 2008).
Zhifang et al., Test automation on moble device, May 2010, 7 pages.
Non-Final Office Action for U.S. Appl. No. 17/230,492, mailed Oct. 14, 2022.
Notice of Allowance for U.S. Appl. No. 16/398,532, mailed Oct. 23, 2022.
Non-Final Office Action for U.S. Appl. No. 16/876,530, mailed Sep. 29, 2020.
Final Office Action for U.S. Appl. No. 16/876,530, mailed Apr. 13, 2021.
Notice of Allowance for U.S. Appl. No. 16/876,530, mailed Jul. 22, 2021.
Dai, Jifeng et al., "R-fcn: Object detectiom via region-based fully convolutional networks", Advances in neural information processing systems 29 (2016). (Year: 2016).
Ren, Shaoqing et al., "Faster r-cnn: Towards real0time object detection with region proposal network." Advances in neutral information processing systems 28 (2015). (Year: 2015).
Zhifang et al., Test automation on mobile device, May 2010, 7 pages.
International Search Report for PCT/US2021/053669, dated May 11, 2022.
Embley et al., "Table-processing paradigms: a research survey", International Journal on Document Analysis and Recognition, vol. 8, No. 2-3, May 9, 2006, pp. 66-86.
Non-Final Office Action for U.S. Appl. No. 16/925,956, mailed Sep. 16, 2021.
Notice of Allowance for U.S. Appl. No. 16/925,956, mailed Jan. 7, 2022.
Pre-Interview Office Action for U.S. Appl. No. 16/398,532, mailed Jul. 8, 2022.
Notice of Allowance for U.S. Appl. No. 16/398,532, mailed Oct. 13, 2022.
Non-Final Office Action for U.S. Appl. No. 17/139,838, mailed Feb. 22, 2022.
Final Office Action for U.S. Appl. No. 17/139,838, mailed Nov. 15, 2022.
Notice of Allowance for U.S. Appl. No. 17/139,838, mailed Apr. 5, 2023.
International Search Report and Written Opinion for PCT/US2021/015691, mailed May 11, 2021.
A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). AMI Press. pp. 226-231 (1996).
Deep Residual Learning for Image Recognition, by K. He, X. Zhang, S. Ren, and J. Sun, arXiv:1512.03385 (2015).

(56) References Cited

OTHER PUBLICATIONS

FaceNet: A Unified Embedding for Face Recognition and Clustering, by F. Schroff, D. Kalenichenko, J. Philbin, arXiv:1503.03832 (2015).
Luqman, et al. "Fuzzy multilevel graph embedding", copyright 2012 Elsevier Ltd.
Sharma et al. Determining similarity in histological images using graph-theoretic description and matching methods for content-based image retrieval in medical diagnostics, Biomed Center, copyright 2012.
First Action Interview Pilot Program Pre-Interview communication for U.S. Appl. No. 16/779,462, mailed Dec. 3, 2021.
Reply under 37 CDT 1.111 to Pre-Interview Communication for U.S. Appl. No. 16/779,462, filed Jan. 25, 2022.
Notice of Allowance for U.S. Appl. No. 16/779,462 mailed Feb. 9, 2022.
Notice of Allowance for U.S. Appl. No. 17/131,674, mailed Jun. 22, 2023.
Non-Final Office Action for U.S. Appl. No. 16/731,044, mailed Jan. 25, 2021.
Notice of Allowance for U.S. Appl. No. 16/731,044, mailed May 5, 2021.
Non-Final Office Action for U.S. Appl. No. 18/126,935, mailed Jul. 13, 2023.
Non-Final Office Action for U.S. Appl. No. 17/139,842, mailed Jul. 18, 2023.
Notice of Allowance for U.S. Appl. No. 17/588,588, mailed Aug. 2, 2023.
Pre-Interview Office Action for U.S. Appl. No. 16/859,488, mailed Jan. 25, 2021.
First Action Interview for U.S. Appl. No. 16/859,488, mailed Mar. 22, 2021.
Final Office Action for U.S. Appl. No. 16/859,488, mailed Jul. 8, 2021.
Notice of Allowance for U.S. Appl. No. 16/859,488, mailed Mar. 30, 2022.
Final Office Action for U.S. Appl. No. 17/463,494, mailed Sep. 6, 2023.
Final Office Action for U.S. Appl. No. 17/160,080, mailed Sep. 11, 2023.
Final Office Action for U.S. Appl. No. 17/534,443, mailed Sep. 11, 2023.
Final Office Action for U.S. Appl. No. 16/930,247 mailed Oct. 12, 2023.
Notice of Allowance for U.S. Appl. No. 17/534,443 mailed Oct. 24, 2023.
International Search Report and Written Opinion for PCT/US2022/013026, mailed Sep. 21, 2022.
Notice of Allowance for U.S. Appl. No. 18/126,935, mailed Jan. 10, 2024.
Notice of Allowance for U.S. Appl. No. 18/215,126, mailed Jan. 25, 2024.
Advisory Action and After Final Pilot Decision for U.S. Appl. No. 17/160,080, mailed Jan. 29, 2024.
Non-Final Office Action for U.S. Appl. No. 17/160,082, mailed Feb. 15, 2024.
Final Office Action for U.S. Appl. No. 17/206,029, mailed Feb. 28, 2024.
Non-Final Office Action for U.S. Appl. No. 17/160,080, mailed Mar. 13, 2024.
Non-Final Office Action for U.S. Appl. No. 17/160,084, mailed Mar. 15, 2024.
Non-Final Office Action for U.S. Appl. No. 18/094,305, mailed May 9, 2024.
Final Office Action for U.S. Appl. No. 17/160,084, mailed May 16, 2024.
Non-Final Office Action for U.S. Appl. No. 18/218,009, mailed May 20, 2024.

* cited by examiner

PARTIAL FINGERPRINT MASKING FOR PATTERN SEARCHING

CROSS-REFERENCE TO RELATED APPLICATION

This application is related to U.S. patent application Ser. No. 17/537,466, filed Nov. 29, 2021, and entitled "DYNAMIC FINGERPRINTS FOR ROBOTIC PROCESS AUTOMATION," which is hereby incorporated herein by reference.

BACKGROUND OF THE INVENTION

Robotic Process Automation (RPA) systems enable automation of repetitive and manually intensive computer-based tasks. In an RPA system, computer software, namely a software robot (often referred to as a "bot"), may mimic the actions of a human being in order to perform various computer-based tasks. For instance, an RPA system can be used to interact with one or more software applications through user interfaces, as a human being would do. Therefore, RPA systems typically do not need to be integrated with existing software applications at a programming level, thereby eliminating the difficulties inherent to integration. Advantageously, RPA systems permit the automation of application level repetitive tasks via software robots that are coded to repeatedly and accurately perform the repetitive task.

RPA systems generally assist users in creating software robots that mimic user interactions with software applications to perform various tasks. Inevitably, the user is performing a task by interacting with one or more software applications. The various user interactions with software applications to perform tasks can be captured in recordings. The recordings include a series of steps. When evaluating different recordings for similarities, the steps, or sequences or steps, within the recording can be compared. Conventionally, steps have associated attributes and these attributes can be used to form a fingerprint or digital identifier for each of the steps. However, these digital identifiers once generated are fixed and not able to be modified, updated or upgraded. As such, over time, the digital identifiers become outdated and cause compatibility problems over time.

Therefore, there is a need for improved approaches to represent steps within recordings to facilitate recognition of same or similar steps in the same or other recordings.

SUMMARY

Improved techniques for producing digital fingerprints to represent steps in a recording of user-initiated events with respect to one or more application programs, and for locating sequences of steps, or patterns, in recordings of user-initiated events with respect to one or more application programs. A digital fingerprint can be formed for each step in a recording by encoding a plurality of attributes for each step in the recording. When operating to locate sequence of steps, or patterns, in the recordings, the digital fingerprint can be modified to allow for less rigid matching of steps. In one embodiment, the digital fingerprint for a given step in a given situation can dynamically generated or modified, such as a request to a server to generate or modify a digital fingerprint.

The invention can be implemented in numerous ways, including as a method, system, device, apparatus (including computer readable medium and graphical user interface). Several embodiments of the invention are discussed below.

As a computer-implemented method for locating matching steps or sequences within recordings of user-initiated events with one or more application programs, the recordings being associated with by a robotic process automation system, one embodiment can, for example, include at least: identifying a set of steps to be located within the recordings; retrieving, for each of the steps, a base digital fingerprint, the base digital fingerprint being previously derived from encodings of attributes associated with the corresponding step; determining, for at least one of the steps, at least a portion of one or more of the attributes associated with the base digital fingerprint that are to be excluded from the base digital fingerprint; modifying the base digital fingerprint for the at least one of the steps to exclude the at least a portion of one or more encodings of the attributes associated with the base digital fingerprint that are to be excluded from the base digital fingerprint, the modifying of the base digital fingerprint producing a modified digital fingerprint for the at least one of the steps; and searching the recordings to locate matching steps or sequences within the recordings, the searching being based on the modified digital fingerprint for the at least one of the steps.

As a Robotic Process Automation (RPA) system, one embodiment can, for example, include at least an RPA server configured to support sequence mining of a plurality of recordings to identify repeating sequences as candidates for creation of at least one software processing agent, the at least one software processing agent pertaining to a series of user-initiated events with one or more software programs operating on one or more computing devices. The RPA server can, for example, include at least: a digital fingerprint subsystem configures to generate a digital fingerprint for a step of a selected recording of the plurality of recordings; a step matching subsystem configures to identify matching steps in different ones of the recordings based on the respective digital fingerprints; and a sequence mining subsystem configured to evaluate a plurality of the matching steps in the recordings to identify at least one repeating sequence. The digital fingerprint subsystem can be further configured to at least: determine a subset of attributes associated with the step that are to be utilized in generating the digital fingerprint; and generate the digital fingerprint for the step in the recording based on at least a plurality of the attributes in the subset of attributes. Further, the digital fingerprint subsystem, the step matching subsystem or the sequence mining subsystem can be further configured to at least modify the digital fingerprint for the step in the recording to facilitate sequence mining by the sequence mining subsystem.

As a non-transitory computer readable medium including at least computer program code tangibly stored therein for locating matching steps or sequences within recordings of user-initiated events with one or more application programs, the recordings being associated with a robotic process automation system, one embodiment can, for example, include at least: computer program code for determining a subset of attributes associated with a given step in a sequence of steps that is to be located in one of more of the recordings that are to be utilized in generating the digital fingerprint; computer program code for generating the digital fingerprint for the given step in the sequence of steps based on the determined subset of attributes; computer program code for determining whether to attempt to locate the sequence of steps in the recordings; computer program code for modifying the digital fingerprint for the given step to alter the digital fingerprint such that a matching sequence with the recordings is easier to be found; and computer program code for attempting to locate the sequence of steps in the recordings if the computer program code for determining determines that it is to be attempted to locate the sequence of steps in the recordings, the attempt to locate being based on at least the modified digital fingerprint for the given step.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF CERTAIN EMBODIMENTS

Figure 1A:
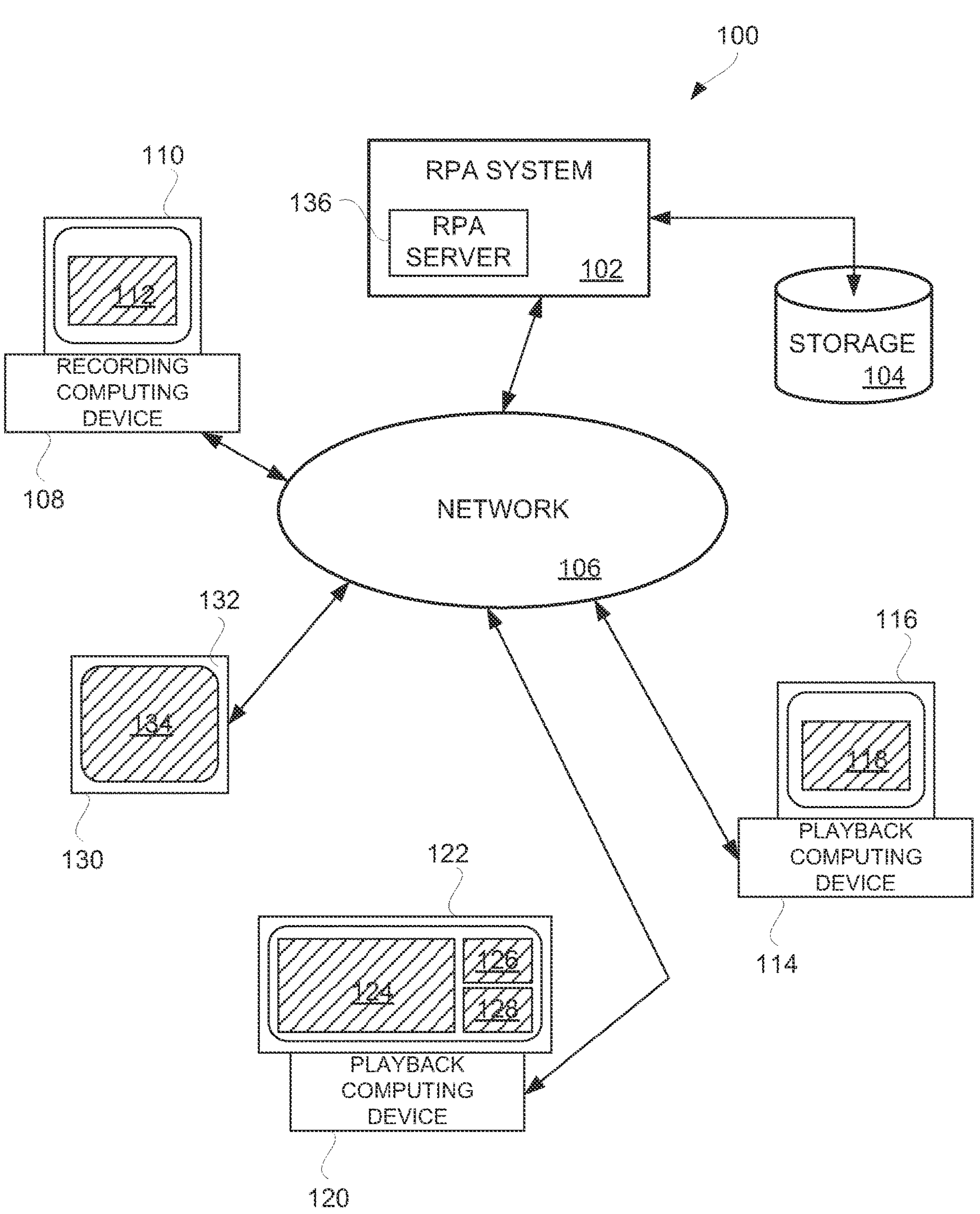
FIG. 1A is a block diagram of a computing environment according to one embodiment.

Embodiments disclosed herein concern improved techniques for producing digital fingerprints to represent steps in a recording of user-initiated events with respect to one or more application programs. A digital fingerprint can be formed for each step in a recording by encoding a plurality of attributes for each step in the recording. The encodings can be determined differently for different attributes of the step. Also, the particular attributes to be used together to form a digital fingerprint can be chosen differently to adjust effectiveness in matching such step with other similar steps. In one embodiment, a digital fingerprint for a given step in a given situation can be dynamically generated, such as by a request to a server to generate a fingerprint. Advantageously, the improved digital fingerprints can be generated as needed (e.g., in real-time) and compatible with changes to encodings or fingerprint methodologies.

The matching can operate on a step level, where the steps are defined by fingerprints. The ability to configure parameters affecting generation of digital fingerprints allows for similarity matching or tolerance for use with matching. The fingerprint being generated can also adapt to a tolerance level that is desired. If matching is to be more flexible in finding similar steps, then the fingerprint can be generated to permit a higher tolerance level. Alternatively, if matching is to be less flexible in finding similar steps, then the fingerprint can be generated to permit a lower tolerance level. By altering one or more parameters, the tolerance level to be used can be altered.

Other embodiments disclosed herein concern improved techniques for locating sequences of steps, or patterns, in recordings of user-initiated events with respect to one or more application programs. A digital fingerprint can be formed for each step in a recording by encoding a plurality of attributes for each step in the recording. When operating to locate sequence of steps, or patterns, in the recordings, the digital fingerprint can be modified to allow for less rigid matching of steps. For example, at least a portion of one or more encodings otherwise being used in the digital fingerprint can effectively be ignored or removed. In one embodiment, the digital fingerprint for a given step in a given situation can dynamically generated or modified, such as a request to a server to generate or modify a digital fingerprint.

Generally speaking, RPA systems use computer software to emulate and integrate the actions of a human interacting within digital systems. In an enterprise environment, these RPA systems are often designed to execute a business process. In some cases, the RPA systems use Artificial Intelligence (AI) and/or other machine learning capabilities to handle high-volume, repeatable tasks that previously required humans to perform. The RPA systems support a plurality of software automation processes (SAPs). The RPA systems also provide for creation, configuration, management, execution, monitoring, and performance of SAPs.

A SAP can also be referred to as a software robot, a software agent, or a bot. A SAP can interpret and execute tasks on a user's behalf. SAPs are particularly well suited for handling a lot of the repetitive tasks that humans perform every day. SAPs can perform a task, or workflow they are tasked with, once or many times and do so consistently and reliably every time. As one example, a SAP can locate and read data in a document, email, file, or window. As another example, a SAP can connect with one or more Enterprise Resource Planning (ERP), Customer Relations Management (CRM), core banking, and other business systems to distribute data where it needs to be in whatever format is necessary. As another example, a SAP can perform data tasks, such as reformatting, extracting, balancing, error checking, moving, copying, and any other desired tasks. As another example, a SAP can grab data desired from a webpage, application, screen, file, or other data source. As still another example, a SAP can be triggered based on time or an event, and can serve to take files or data sets and move them to another location, whether it is to a customer, vendor, application, department, or storage. These various capabilities can also be used in any combination. As an example of an integrated SAP, the SAP can start a task or workflow based on a trigger, such as a file being uploaded to a file transfer protocol (FTP) system. The integrated SAP can then download that file, scrape relevant data from it, upload the relevant data to a database, and send an email to inform the recipient that the data has been successfully processed.

Embodiments of various aspects of the invention are discussed below with reference to FIGS. 1A-14. However, those skilled in the art will readily appreciate that the detailed description given herein with respect to these figures is for explanatory purposes as the invention extends beyond these limited embodiments.

FIG. 1A is a block diagram of a computing environment 100 according to one embodiment. The computing environment 100 includes an RPA system 102. The RPA system 102 can be coupled to storage 104 for storage of recordings of user interactions, SAPs (e.g., bots), or any other desired data or information.

The computing environment 100 can support various different types of computing devices that can interact with the RPA system 102. The computing environment 100 can also include a network 106 made up of one or more wired or wireless networks that serve to electronically interconnect various computing devices, such as, for data transfer. These computing devices can be, for example, a recording computing device, a playback computing device, or both, or any other computing devices. As shown in FIG. 1A, the computing environment 100 can include a recording computing device 108 that includes a display device 110 and a window 112 presented on the display device 110. The window 112 can, in one example, depict a user interface that is associated with recording user interactions with one or more application programs.

In the simplified block diagram shown in FIG. 1A, the RPA system 102 supports one or more recording sessions. As an example, FIG. 1A illustrates that the RPA system 102 can receive or include recording, such as recordings acquired via the recording computing device 108. Each recording denotes a series of user interactions with one or more application programs operating on a computing device, which can be recorded and stored (or received and stored) by storage 104.

In general, a recording is an electronic record of a series of user interactions, such as actions or events, with one or more software programs operating on one or more computing devices. More generally, the user interactions within a recording are referred to as "steps". In one implementation, these steps can also be referred to as "click events". The recording can be stored in an electronic file. The data stored within the electronic file can denote the order in which the user interactions occurred. The electronic file can, for example, use a structured format, such as a JavaScript Object Notation (JSON) format, to detail the data within the recording. JSON is a standard text-based format for representing structured data based on JavaScript object syntax.

Each recording can be examined, such as by the RPA system 102, and processed to produce digital fingerprint for each of its steps. The digital fingerprints can then compare various recordings, which can be used to identify repeating sequences suitable for automation by software automation processes.

The computing environment 100 shown in FIG. 1A also includes various playback computing devices. A first playback computing device 114 includes a display device 116 that can present a window 118. A second playback computing device 120 includes a display device 122 that can present a first window 124, a second window 126 and a third window 128. The number of windows is not intended to be limiting and can be any number of windows desired by the user and/or to complete the desired task. A third playback computing device 130 includes a display device 132 that can present a window 134. More generally, the windows are screens that are visible on respective display devices and configured to present documents, information or user interfaces. Often the windows are produced by software programs, such as application programs or operating systems.

The computing environment 100 serves to support recordation of a series of user interactions of a user with one or more software programs operating on a computing device, such as the recording computing device 108. In the case that distinct recordings pertain to or include same or similar sequences of steps (e.g., by comparing digital fingerprints), the recordings can be understood to include matching sequences. By discovering and defining matching sequences of steps (which can be referred to as patterns), the RPA system 102 is then able to recognize matching sequences and process them in an automated manner.

The RPA system 102 can optionally also create SAPs. The RPA system 102, using any created SAPs, can subsequently provide programmatic playback of the recordings with the same one or more software programs operating on the same or different computing device. For example, the programmatic playback can be performed on the first playback computing device 114, the second playback computing device 120, and/or the third playback computing device 130. Programmatic playback refers to the notion that the playback is undertaken by a computer program, as opposed to a user.

The RPA system 102 supports not only recording, examination and matching steps of recordings but also creation, storage and execution of SAPs for carrying out tasks in an automated manner. These SAPs can be referred to as "software robots" or "bots". The computing environment 100 can include storage 104 for storage of the SAPs (e.g., bots) that were created.

In addition, the RPA system 102 can further support the execution of the one or more SAPs created by the RPA system 102 and stored in storage 104. Execution (or running) of a SAP at a computing device (i.e., first playback computing device 114, second playback computing device 120, and/or third playback computing device 130) can cause playback of the SAP. That is, when a SAP is executed or run by one or more computing devices (i.e., first playback computing device 114, second playback computing device 120, and/or third playback computing device 130), the SAP is being "played back" or undergoing "playback." The RPA system 102 can support the execution of a SAP in any of a plurality of different playback sessions. These playback sessions can each execute the same or different SAPs.

In one embodiment, the RPA system 102 can include an RPA server 136. The RPA server 136 permits the RPA system 102 to operate, for example, as a cloud service available to various clients, such as the one or more computing devices. The one or more computing devices can interact with the RPA server 136 to obtain RPA functionality. The one or more computing devices (e.g., first playback computing device 114, second playback computing device 120, or third playback computing device 130) can operate as client devices that interact with the PRA server 136.

Figure 1B:
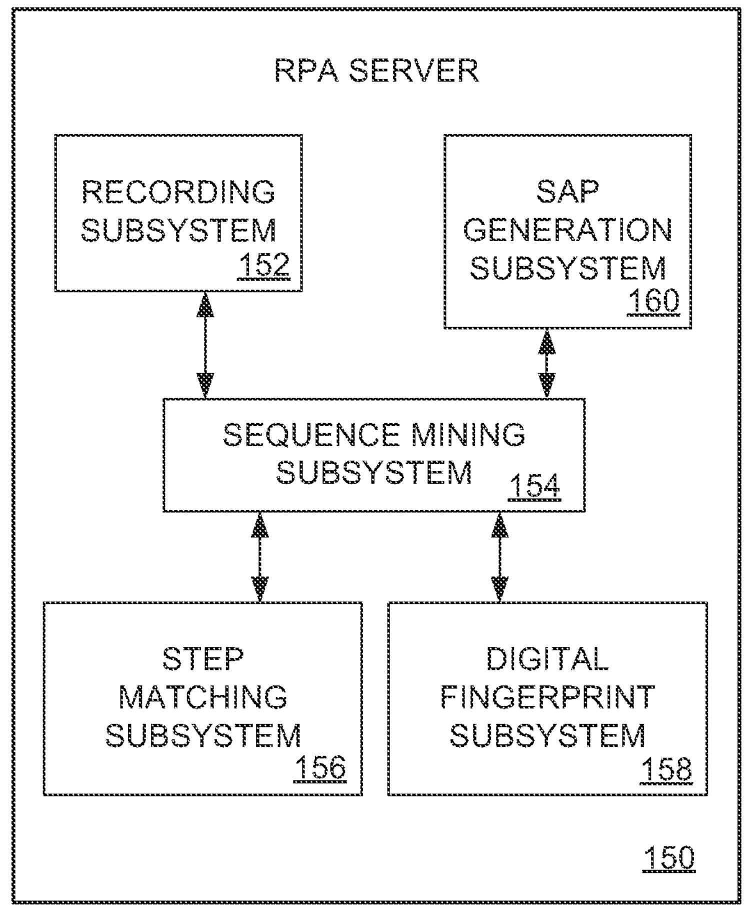
FIG. 1B is a block diagram of an RPA server according to one embodiment.

FIG. 1B is a block diagram of an RPA server 150 according to one embodiment. The RPA server 150 can, for example, be the PRA server 136 illustrated in FIG. 1A.

The RPA server 150 can include a recording subsystem 152 that assists client devices in capturing recordings and/or processing the recordings. For example, the recording subsystem 152 can receive recordings from client devices, and then process the recordings to store the recordings in a data structure format. One suitable data structure format is a suffix tree. The RPA server 150 can also include a sequence mining subsystem 154. The sequence mining subsystem 154 can process the recordings stored in the data structure format to identify matching sequences within a plurality of the recordings. In doing so, the sequence mining module 154 can interact with a step matching subsystem 156 and a digital fingerprint subsystem 158. The sequence mining subsystem 154 can interact with the digital fingerprint subsystem 158 to acquire digital fingerprints for steps of recordings. These fingerprints can then be used by the step matching subsystem 156 to identify matching steps or sequences within the recordings. The sequence mining system 154 can then determine those sequences (or steps) within the recordings that are repeating and common place, and thus good candidates for SAPs.

The RPA server 150 can also include a SAP generation subsystem 160. The SAP generation subsystem 160 can generate a SAP (e.g., bot) to carry out at least a sequence of steps that has been determined by the sequence mining subsystem 154 to be a good candidate for a SAP.

Figure 2A:
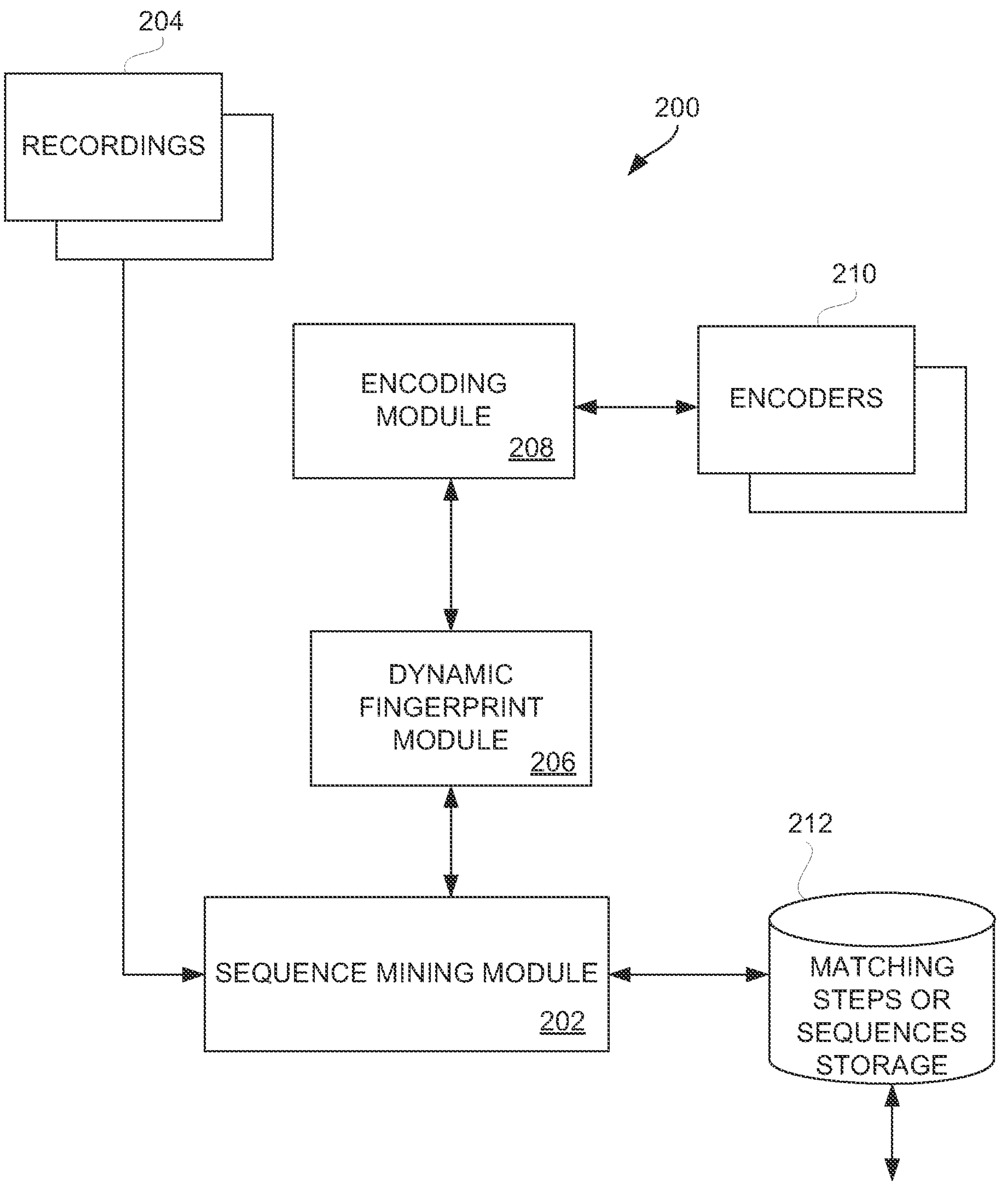
FIG. 2A is a block diagram of an RPA sequence mining system according to one embodiment.

FIG. 2A is a block diagram of an RPA sequence mining system 200 according to one embodiment. The RPA sequence mining system 200 can, for example, be performed by the RPA server 136 illustrated in FIG. 1A. In particular, the RPA sequence mining system 200 can be performed by the sequence mining subsystem 154, the step matching subsystem 156 and/or the digital fingerprint sub-system 158 illustrated in FIG. 1B.

The RPA sequence mining system 200 includes a sequence mining module 202. The sequence mining module 202 can receive recordings and then examine the recordings 204 to identify sequences of steps that are commonly utilized. In doing so, the sequence mining module 202 typical utilizes a digital fingerprint that digitally represents a step. The sequence mining module 202 can interact with a dynamic fingerprint module 206 to obtain a fingerprint for a given step of a recording. The dynamic fingerprint module 206 can operate to dynamically produce a fingerprint that is being requested by the sequence mining module 202. In such case, the dynamic fingerprint module 206 can interact with an encoding module 208 to cause the encoding module 208 to produce encodings for a set of attributes associated with the given step of the recording. The encodings can be produced by one or more encoders 210. For the set of attributes, each attribute being encoded can (but need not) utilize a different one of the encoders 210.

The resulting encodings can then be provided to the dynamic fingerprint module 206 where a digital fingerprint can be formed for the given step. The digital fingerprint can be formed for the given step by combining together the encodings for the set of attributes associated with the given step, as provided by the encoding module 208. The dynamic fingerprint module 206 can then forward the digital fingerprint for the given step to the sequence mining module 202. The sequence mining module 202 can then use the digital fingerprint for the given step when searching for matching steps or sequences within the recordings 204 or with a predetermined pattern. In other words, the sequence mining module 202 evaluates the recordings 204 using the various fingerprints for the numerous steps involved and determines matching steps for sequences amongst the recordings 204 and/or predetermined patterns.

The sequence mining module 202 can store any found matching steps or sequences in a matching steps or sequence storage 212. The matching steps or sequences storage 212 can be implemented used a data storage memory or a database. Thereafter, the RPA system can utilize the matching steps or sequences in the generation of new SAP's or selection of preexisting SAPs. For example, a SAP generation subsystem, such as the SAP generation subsystem 160 illustrated in FIG. 1B associated with an RPA system can access and retrieve matching steps or sequences from the matching steps or sequences storage 212.

Figure 2B:
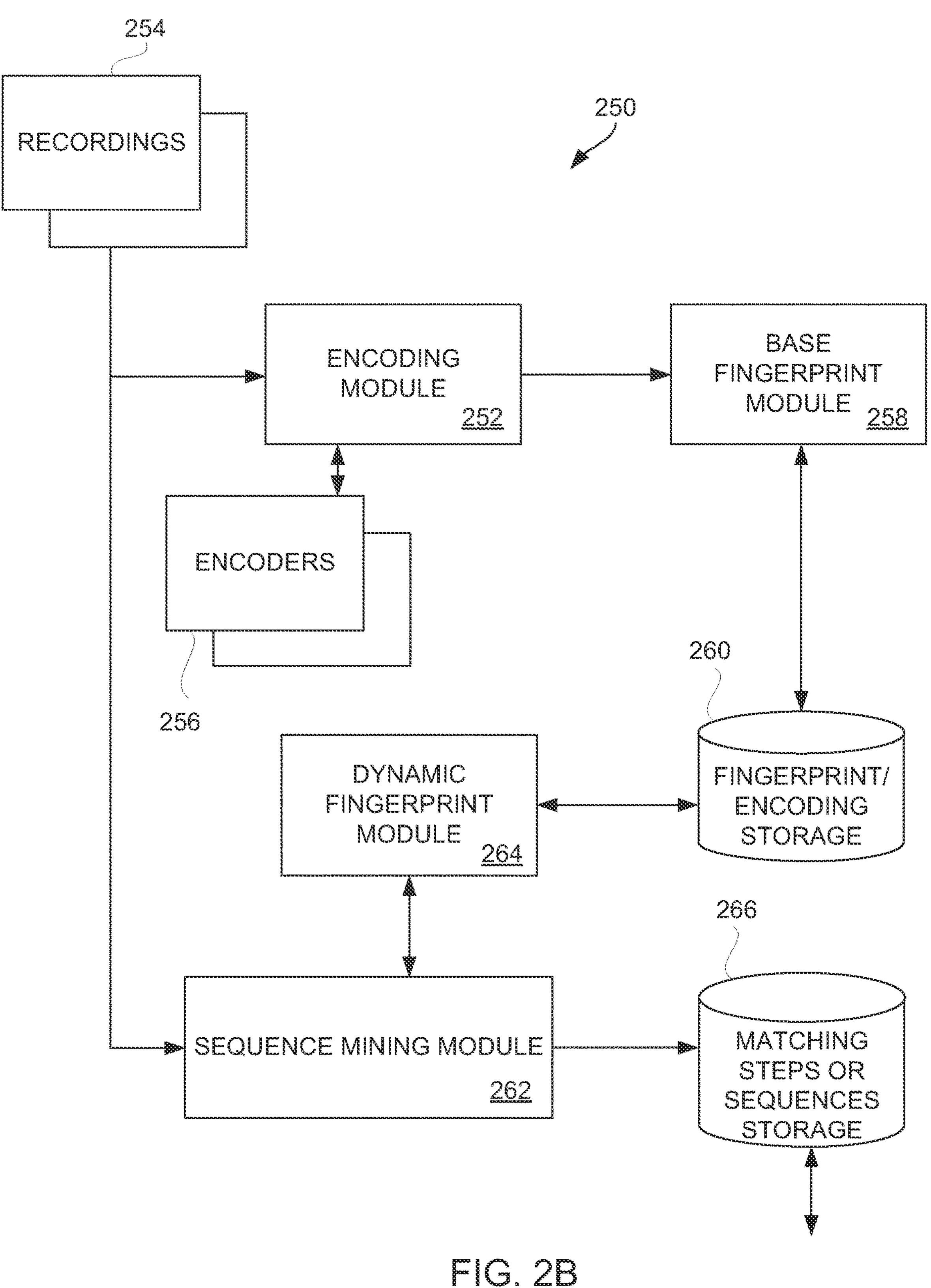
FIG. 2B is a block diagram of an RPA sequence mining system according to another embodiment.

FIG. 2B is a block diagram of an RPA sequence mining system 250 according to another embodiment. The RPA sequence mining system 250 can, for example, be performed by the RPA server 136 illustrated in FIG. 1A. In particular, the RPA sequence mining system 250 can be performed by the sequence mining subsystem 154, the step matching subsystem 156 and/or the digital fingerprint sub-system 158 illustrated in FIG. 1B.

The RPA sequence mining system 250 can include an encoding module 252. The encoding module 252 can receive a recording 254 and operates to encode a plurality of steps within the recording 254. The encoding module 252 can use one or more encoders 256 to produce encodings for each of the attributes for the particular step being encoded. The encoding module 252 can produce encodings for a set of attributes associated with the given step of the recording. For the set of attributes, each attribute being encoded can (but need not) utilize a different one of the encoders 256.

The resulting encodings can be provided to a base fingerprint module 258. At the base fingerprint module 258, the encodings for the plurality of steps of the recording 254 can be used to form a digital fingerprint for each of the respective steps. The digital fingerprint can be stored in a fingerprint/encoding storage 260. In addition to storing the digital fingerprint, the associated encodings produced by the encoding module 252 can also be stored in the fingerprint/encoding storage 260.

After a fingerprint has been produced and stored for the various steps of the recording 254, other of the recordings 254 can be similarly processed. Thereafter, the recordings 254 can be processed by a sequence mining module 262. The sequence mining module 262 can examine the recordings 254 to look for sequences of steps that are commonly utilized. In doing so, the sequence mining module 262 typical utilizes a digital fingerprint that digitally represents a step. The sequence mining module 262 can interact with a dynamic fingerprint module 264 to obtain a fingerprint for a given step. The dynamic fingerprint module 264 can operate to dynamically produce the fingerprint that is being requested by the sequence mining module 262. In such case, the dynamic fingerprint module 264 can access the digital fingerprint from the fingerprint/encoding storage 260. Here, the digital fingerprint for the given step has already been produced. The dynamic fingerprint module 264 could utilized the digital fingerprint as retrieved from the fingerprint/encoding storage 260. The digital fingerprint could be used as retrieved, or it could be dynamically altered to impact its matching flexibility. For example, the digital fingerprint as retrieved could be modified to eliminate some or all of an encoding for one or more of the attributes for the given step. Alternatively, the dynamic fingerprint module 264 could retrieve the encodings for the various attributes of the given step, and then form a dynamic fingerprint for the given step.

In such case, the dynamic digital fingerprint can choose to not include at least a portion of an encoding for one or more of the various attributes.

In either case, the resulting digital fingerprint for the given step can be provided to the sequence mining module 262 by the dynamic fingerprint module 264. The sequence mining module 262 evaluates the recordings 254 using the various digital fingerprints for the numerous steps involved and determines matching steps or sequences amongst the recordings 254 and/or predetermined patterns. These matching steps or sequences can be stored in a matching steps or sequences storage 266.

Thereafter, the RPA system can utilize the matching steps or sequences stored in the matching steps or sequences storage 266, such as in the generation of SAPs or selection of preexisting SAPs. For example, a SAP generation subsystem, such as the SAP generation subsystem 160 illustrated in FIG. 1B associated with an RPA system can access and retrieve matching steps or sequences from the matching steps or sequences storage 266.

A recorder records user interactions with one or more application programs to produce recordings. These user interactions are captured as a series of steps. A step is defined by a number of attributes that the recorder was able to capture for the corresponding user action. Some examples of these attributes can be application and application window on which the action was performed, object in the application (e.g., button, textbox or other user interface (UI) element) on which the action was performed, user action (e.g., clicks, keyboard events, drag-drop, etc.), HTML details like target object's name, ID, class, DOM path, as examples. In case of web application, the attributes can include mouse positions, target object text, and the like.

In one embodiment, a step in a recording can be defined by its attributes. For each step, a recorder can capture a plurality of attributes, such as application, title, action_name, action_value, ui_criteria_name, and various others. For example, an exemplary step in a recording can have the following set of attributes:

```
{
  "application": "excel",
  "title": "Book8 - Excel",
  "action__name": "buttonAction",
  "action__value": "LEFTCLICK",
  "action__exp__path": "",
  "class__name": "NetUIHWND",
  "ui__criteria__name": "Copy",
  "dom__path": "" ,
  "criteria__path": "4|3|4|1|4|1|4|1|4|1|4|-2|1|1|1|3|1",
  "ui__control__type": "BUTTON",
  "ui__technology__path": "MS__ACTIVE__ACCESSIBILITY",
  "ui__window__name": "Book8 - Excel",
  "html__tag": "",
  "inner__html__value": "",
  "html__class": "",
  "html__inner__text": "",
  "html__href": "",
  "html__title": "",
  "user__comment": "",
  "input__value": ""
}
```

However, to efficiently perform processing to locate same or similar steps, such as done in sequence process mining, the set of attributes that define a step can be converted into digital fingerprints.

A fingerprint, namely, a digital fingerprint, for a step can be produced from encodings of attributes of the step that are combined together. An encoder for an attribute operates to convert an attribute's value into an encoding. In one embodiment, such encoding is a hexadecimal string, and the digital fingerprint is a hexadecimal string of pre-configured length. The digital fingerprint can consist of all encoded attribute values (i.e., encodings) of the selected attributes in a configured sequential order. For example, once all the selected attributes of a step are separately encoded using an appropriate encoding technique, the encodings can be concatenated in a specified order to form a digital fingerprint for the step. The order by which the encodings are concatenated can also be configurable.

According to one embodiment, a digital fingerprint for a step can be created using a subset of the available attributes. This allows for only important and/or useful attributes to be considered. It also impacts matching of similar steps. The idea is to be selective on which subset of attributes captured by a recorder should be used to identify a step. Using too few attributes can cause different steps to be incorrectly considered similar. Alternatively, using all the attributes can cause similar steps to be incorrectly considered different because of minor differences. Hence, attribute selection is important. Attribute selection can be based on identifying a minimum number of required attributes to identify a target object and action.

Generally speaking, the following attributes of steps are most useful: application name, ui_control_type, action_value, ui_criteria_name, and input_value. The attribute "application name" identifies the application the user is working with. The attribute "ui_control_type" identifies the control the user is interacting with (e.g., button, textbox, etc.). The attribute "action_value" denotes the action the user is performing to interact with the control (e.g., Left Click, Settext, etc.). The attribute "ui_criteria_name" contains details on the control label/identifier. The attribute "input_value" mostly contains user entered text, but also contains information of menu values selected by users. Other attributes like title, criteria_path, and similar attributes contain too much variation and their contribution to mining patterns is visually negligible. For example, a window title like "book1.txt" or "sample1.txt" does not provide any help in capturing patterns resulting from the user actions on that application window.

Additionally, the subset of available attributes to be considered is configurable. That is, different or new attributes for generation of a digital fingerprint can be chosen by a configuration change, without needing any coding change. This allows for the ability to dynamically change fingerprints for different situations. For example, when performing process mining and looking for matching steps across multiple recordings or patterns, the subset of attributes can be changed to vary the rigidity or tolerance in matching of similar steps.

Still further, different attributes can be encoded using different encoders. In one embodiment, an encoder receives an attribute value as an input, and produces an encoding. The encoding can, for example, be a hexadecimal string. Hence, each of the attributes in the subset of attributes are separately encoded. In doing so, each of the attributes can be encoded using a different type of encoder.

Examples of different types of encoders can, for example, include a hash encoder, an indexed encoder, and a word embedding encoder.

A hash encoder is well suited for attributes that have numerous possible values. The hash encoder produces a hash value. One suitable hashing function is Blake 2b. For example, the attribute "ui_criteria_name" can have numerous different names, so its value can be encoded by a hash encoder.

An indexed encoder is well suited for attributes that have a small and finite set of values. For example, the attributes "application name", "action_name" and "ui_control_type" can have limited values, so its value can be encoded by an indexed encoder. A dictionary of the finite set of values can be maintained and each unique value can be assigned a unique hexadecimal number. In one implementation, encoding can be obtained by a table or dictionary lookup. For similarity matching, one advantage is that values know to be similar can be given same hexadecimal value which will help in their comparison. For example, indexed encoding for "application name" attribute can have same hexadecimal values for Google Chrome, Internet Explorer, Mozilla Firefox and other browser applications.

A word embedding encoder is an encoder that can use word embedding to support similarity-based matching. Word embeddings provide an efficient, dense representation in which similar words have a similar encoding. In natural language processing (NLP), word embedding denotes the representation of words for text analysis, typically in the form of a real-valued vector that encodes the meaning of a word such that the words that are closer in the vector space are expected to be similar in meaning. In one embodiment, a word embedding encoder can be used instead of a hash encoder, such as when similarity matching is desirable.

Additionally, an encoder can be assisted by pre-processing. For example, an attribute such as "input_value" can be pre-processed to ignore its input value if its associated attribute "action_value" for that attribute is "SETTEXT". Such pre-processing can remove "noise" that is present as part of user input. Following the pre-processing, the pre-processed "input_value" can be encoded by a suitable encoder, such as a hash encoder or indexed encoder.

After the attributes in the subset of attributes have been separately encoded, the encodings can be joined together to for a digital fingerprint for the step. For example, the joining of the encodings can be implemented by concatenating of the encodings for each of the attributes in the subset of attributes. The order by which the different encodings are ordered can be fixed or configurable.

The encodings can have a predetermined number of digits, such as hexadecimal digits. For attributes that have a finite number of potential values, then the number of digits used can be enough to represent the finite number of potential values. For example, if there are less than fifty (50) possible values for an attribute, then two (2) hexadecimal digits can be used. For attributes that have an unlimited number of potential values, then six (6) hexadecimical digits can be used in one embodiment.

An example of encodings for a subset of attributes and for the resulting digital fingerprint therefrom is provided below. Assume that a given step has the following subset of attributes and their associated values: "application": "outlook", "action_value": "LEFTCLICK", "ui_control_type": "BUTTON", "ui_criteria_name": "SEND", "input_value": " . . . ". The corresponding encodings for the respective attribute values can, for example, be: outlook>010, LEFTCLICK>03, BUTTON>10, SEND>12AB45, " . . . ">1EF002. The resulting digital fingerprint is formed by combining together the encodings, which would be: 010031012AB451EF002. In this example, the encodings are combined by concatenating the encodings together. In one embodiment, the order by which the encodings for the different attributes are combined can be configurable. The resulting digital fingerprint is dependent on the order by which the encodings are combined. For example, if the order of the last two attributes in the above example were switched, then the resulting digital fingerprint would be: 01003101EF00212AB45.

When searching for matching steps or sequences, such as for sequence mining, pattern mining is performed. A pattern is a predetermined sequence of one or more steps. Pattern mining searches for a match to a given pattern found in one or more recordings. In one embodiment, the pattern search can (i) encode the attributes for each of the steps within a recording to be considered, and form a digital footprint for each of the steps; (ii) encode each of the steps in the given pattern as noted in its pattern definition, and form a digital footprint for each of the steps; (iii) place the digital footprints for the steps of the recording to be considered into a suffix tree; and (iv) parse the suffix tree to search for matches to the digital fingerprints for the given pattern.

In one embodiment, a pattern definition similar to a step definition can specify a subset of attributes that are to be considered when searching for matches. For example, metadata within the pattern definition can specify those of the attributes that are required for matching with the given pattern, so called required attributes. As another example, an attribute list can store a list of attributes that are to be considered when searching for matches to the given pattern. An example of a pattern definition for the pattern labeled "Copy—Menu" is as follows:

```
{
  "id": 7,
  "label": "Copy - Menu",
  "weight": 2,
  "fpModelMetaData": {
    "attributes": [
      {
        "application": "excel",
        "title": "Book8 - Excel",
        "action_name": "buttonAction",
        "action_value": "LEFTCLICK",
        "action_exp_path": "",
        "class_name": "NetUIHWND",
        "ui_criteria_name": "Copy",
        "dom_path": "" ,
        "criteria_path":
"4|3|4|1|4|1|4|1|4|1|4|-2|1|1|1|3|1",
        "ui_control_type": "BUTTON",
        "ui_technology_path":
"MS_ACTIVE_ACCESSIBILITY",
        "ui_window_name": "Book8 - Excel",
        "html_tag": "",
        "inner_html_value": "",
        "html_class": "",
        "html_inner_text": "",
        "html_href": "",
        "html_title": "",
        "user_comment": "",
        "input_value": ""
      }
    ],
    "requiredAttributes": ["application",
"action_name", "action_value", "ui_criteria_name"]
    "type": "STRICT",
    "version": 1
  }
}
```

In the above example, the "requiredAttributes" specifies list of attributes required to identify the pattern, that is, a step's digital fingerprint in this example. Additionally, in one embodiment, although not shown in the above pattern definition, one or more of the attributes could include a weight or score value to indicate the relative importance of the corresponding attribute.

In the above example, if the attributes selected earlier in the processing for encoding are "application", "ui_control_type", "action_value", "criteria_name" but it turns out that the attribute "criteria_name" is not required for a specific mining process, then the attribute "criteria_name" can be masked out from the resulting digital fingerprint. For example, if the digital fingerprint is "001131A034245" prior to masking, the resulting fingerprint following masking will be "001131A000000", with the encoding for the attribute criteria_name represented as 000000 to represent its non-consideration due to masking.

When searching for matching steps, such as during sequence process mining, suffix tree searching can be implemented to search for matches attribute by attribute, and ignoring all attributes with an encoding of all zeros. In general, during searching for matching steps, different attributes in the fingerprint can be treated or scored differently. For example, if a certain comparison does not require the application attribute to be same, the application attribute match can be ignored (i.e., masked), and thus then the comparison will be dependent on similarity between remaining attributes.

Figure 3:
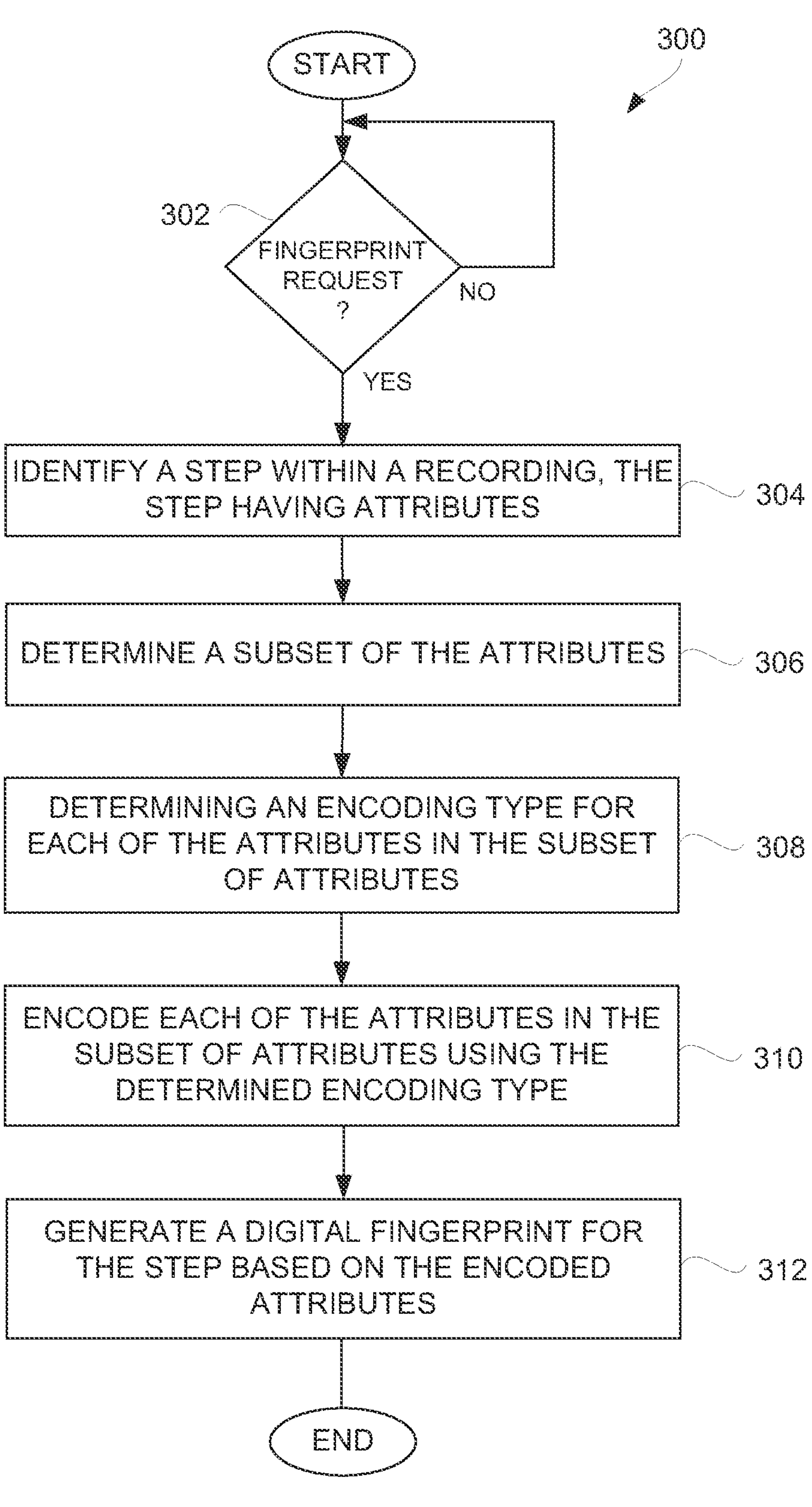
FIG. 3 is a flow diagram of a fingerprint generation process according to one embodiment.

FIG. 3 is a flow diagram of a fingerprint generation process 300 according to one embodiment. The fingerprint generation process 300 can, for example, be performed by an RPA server, such as the RPA server 136 illustrated in FIG. 1A or the RPA server 150 illustrated in FIG. 1B.

The fingerprint generation process 300 can begin with a decision 302 that determines whether a fingerprint request has been received. The fingerprint request is, for example, from a client computing device seeking a fingerprint for a step within a recording. The RPA server can operate to receive and respond to the fingerprint request.

When the decision 302 determines that a fingerprint request has not been received, then the fingerprint generation process 300 can await such a request. On the other hand, when the decision 302 determines that a fingerprint request has been received, then a step within a recording can be identified 304. The identified step can have various attributes associated therewith.

Next, a subset of the attributes for the identified step can be determined 306. Here, although a step captured in a recording has a plurality of attributes, in most cases only a subset of those attributes are utilized with respect to fingerprint generation. Hence, the subset of the attributes being determined 306 operates to identify an appropriate subset of the attributes to be utilized in the generation of the fingerprint. In one implementation, the subset can be determined from empirical data. In another implementation, the subset can be learned using machine learning.

After the identified step has been identified and the subset of attributes are determined, the fingerprint generation process 300 operates to generate a digital fingerprint for the identified step using the subset of attributes. For each of the attributes in the subset of attributes, an encoding type can be determined 308. In one implementation, the encoding type can be predetermined based on the attribute. For example, as discussed above attributes with finite values can use an indexed encoding, and attributes with almost unlimited values can use a hash encoding. Then, each of the attributes in the subset of attributes can be encoded 310 using the determined encoding type. Finally, a digital fingerprint can be generated 312 for the identified step based on the encoded attributes. After the digital fingerprint has been generated 312, the fingerprint generation process 300 can end.

Two steps from different recordings that have a matching set of attributes can be deemed the same (or matching) step. The matching determination can be performed using digital fingerprints that are determined for the attributes. The attributes being used for step identification and matching can vary with implementation. Some exemplary attributes include one or more of: application name (or application), action name (or action), action value, UI criteria name (or criteria name), class name, UI element (or element), and/or input data (or input). As examples, application name can pertain to explorer, outlook, chrome, java, and other similar names; action name can pertain to LEFTCLICK, SETTEXT, and other similar names; action value can pertain to clientAction, buttonAction, textboxAction, and other similar values; UI criteria name can pertain to Recorder Warning, New Tab, New Email, Subject, Message, Send, Close, and other similar criteria names; class name can pertain to Chrome_WidgetWin_1, GlassWndClass-GlassWindowClass-3, and other similar class names; and UI element can pertain to button, textbox, client, and other similar UI elements. Input data is data a user inputs via the UI.

Figure 4:
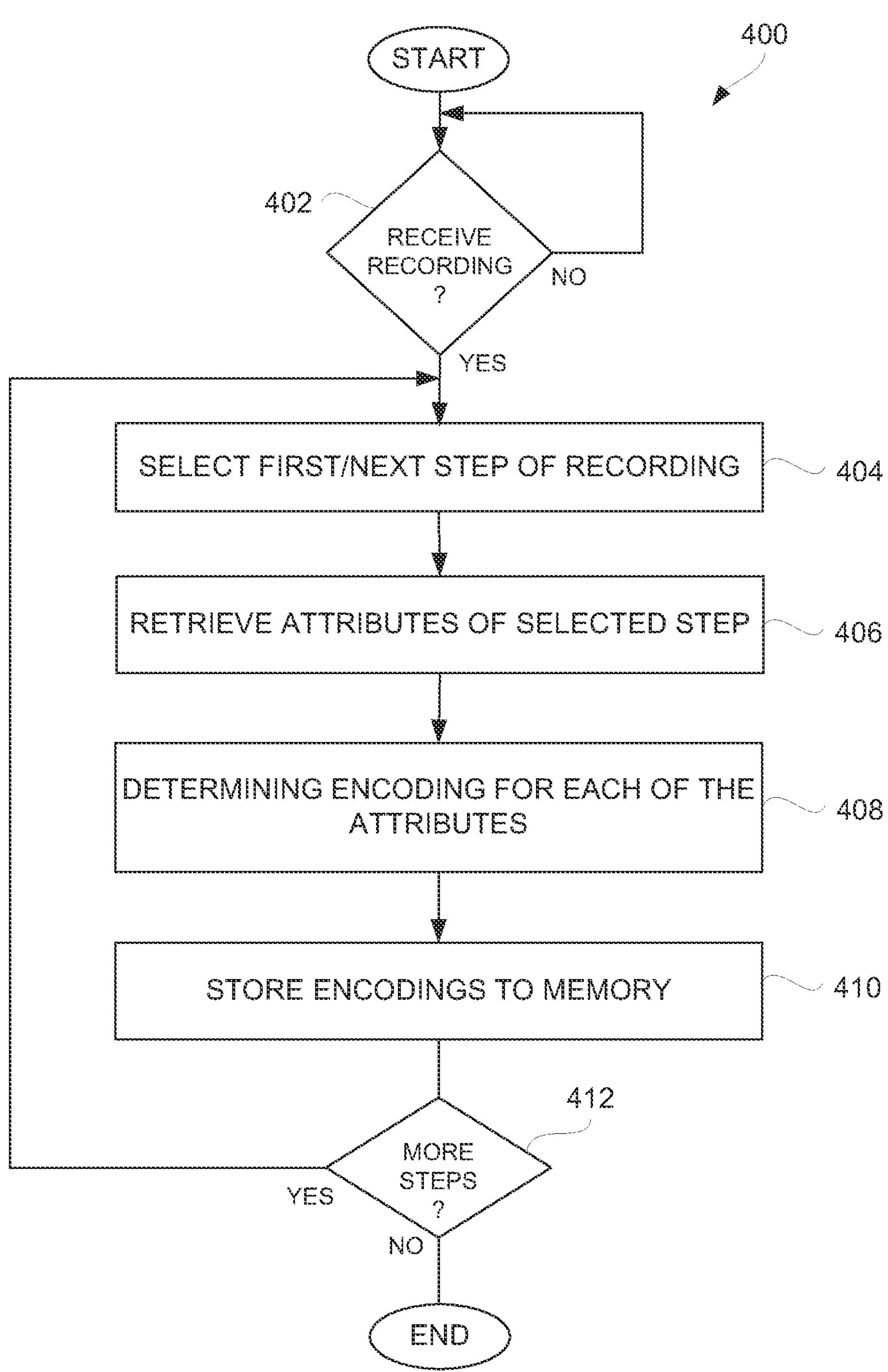
FIG. 4 is a flow diagram of a step encoding process according to one embodiment.

FIG. 4 is a flow diagram of a step encoding process 400 according to one embodiment. The step encoding process 400 can, for example, be performed by the encoding module 208 illustrated in FIG. 2A, the encoding module 252 illustrated in FIG. 2B, or the step matching subsystem 156 illustrated in FIG. 1B. More generally, the step encoding process 400 can be performed by an RPA server, such as the RPA server 136 illustrated in FIG. 1A.

The step encoding process 400 can begin with a decision 402 that determines whether a recording has been received. Here, the recording is a recording of user interactions with one or more application programs, such as a recording captured by an RPA system. Typically, the recording includes a plurality of steps, each of the steps having a plurality of attributes. The step encoding process 400 operates to encode each of the attributes (or at least a subset thereof) for each of the steps. When the decision 402 determines that a recording has not been received, then the step encoding process 400 can await receipt of such a recording.

Once the decision 402 determines that a recording has been received, a first step in the recording can be selected 404. In this instance, the first step is the selected step. Next, attributes of the selected step can be retrieved 406. Then, encodings for each of the attributes of the selected step can be determined 408. In doing so, in one implementation, different types of attributes can use different encoding techniques, such as performed by encoders. After the encoding for the attributes of the selected step have been determined 408, the encodings can be stored 410 to memory.

After the attributes for the selected step have been encoded and stored, a decision 412 can determine whether there are more steps within the recording to be processed. When the decision 412 determines that there are more steps in the recording to be processed, the step encoding process 400 can return to repeat the block 404 and subsequent blocks so that a next step of the recording can be selected 404 and similarly processed to encode the attributes for that next step. In this instance, the next step is the selected step. Once the decision 412 determines that there are no more steps of the recording to be processed, the step encoding process 400 can end.

Figure 5:
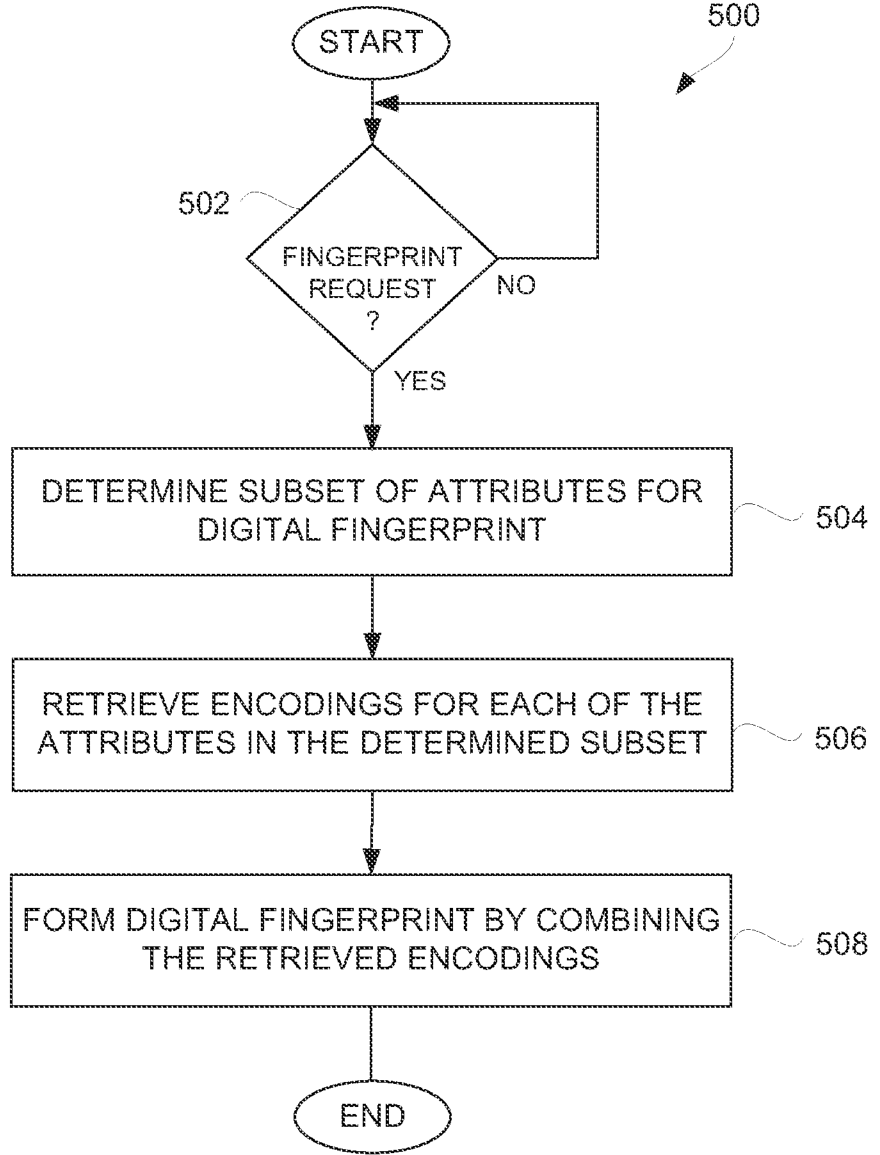
FIG. 5 is a flow diagram of a fingerprint formation process according to one embodiment.

FIG. 5 is a flow diagram of a fingerprint formation process 500 according to one embodiment. The fingerprint formation process 500 can, for example, be performed by the fingerprint module 206 illustrated in FIG. 2A, the dynamic fingerprint module 264 illustrated in FIG. 2B, or the digital fingerprint subsystem 158 illustrated in FIG. 1B. More generally, the fingerprint formation process 500 can be performed by an RPA server, such as the RPA server 136 illustrated in FIG. 1A. In one implementation, the fingerprint formation process 500 follows after the step encoding process 400 illustrated in FIG. 4.

The fingerprint formation process 500 can begin with a decision 502 that determines whether a fingerprint request has been received. When the decision 502 determines that a fingerprint request has not yet been received, then the fingerprint formation process 500 awaits such a request.

On the other hand, once the decision 502 determines that a fingerprint request has been received, a subset of attributes for a digital fingerprint can be determined 504. Typically, the fingerprint is associated with a step within a recording, and the step has a plurality of attributes that can be used to form a fingerprint. The determination 504 is to determine the subset of the available attributes that are to be utilized for forming the digital fingerprint. After the subset of attributes has been determined 504, encodings for each of the attributes in the determined subset can be retrieved 506. In one implementation, the encodings being retrieved 506 have previously been generated and stored in memory (i.e., via the step encoding process 400 illustrated in FIG. 4), and thus need only be retrieved from memory. In another implementation, the encodings being retrieved 506 are generated when needed, and thus retrieved upon being generated.

After the encodings for each of the attributes in the determined subset have been retrieved 506, a digital fingerprint can be formed 508 for the step within the recording by combining the retrieved encodings for each of the attributes. The manner by which the retrieved encodings are combined can vary with implementation. After the digital fingerprint has been formed 508 by combining the retrieved encodings, the fingerprint formation process 500 can end.

As noted above, an RPA system can make use of digital fingerprints for steps of recordings for various operations. One particular use of such digital fingerprints is for locating sequences of steps present in various recordings. Matching sequences of steps can be used to organize or group sequences, or can be used to locate similar recordings or candidates for SAPs.

Another aspect disclosed herein is that digital fingerprints can be used when searching through recordings for specific sequence or patterns. This can be referred to as sequence mining or pattern mining. In such case, digital fingerprints for steps can be modified to, in effect, ignore one or more attributes whose encoding are part of the digital fingerprints. By doing so, sequence or pattern mining can be more effective because the digital fingerprints can be more tolerant, instead of being too restrictive.

In one embodiment, the one or more attributes to be excluded as being determined can be dependent on a pattern or sequence of steps being searched for, such as in sequence or patterning mining of recordings. In such an embodiment, the pattern or sequence is predetermined and can be defined by a pattern definition, which can include data to denote those attributes to use (or not use) when searching (e.g., mining) for the corresponding pattern or sequence.

Pattern mining involves grouping steps into a sequence which can be considered as a repeatable or common tasks or sub-tasks. This grouping can be done at one or more levels. A lower level or first level pattern can include a sequence of steps. However, higher level patterns can contain sequence of steps and one or more lower-level patterns. Those patterns that are defined and stored can be used in mining for matching patterns in new recordings.

A pattern can be defined with a label and sequence of steps that makes up the pattern. The sequence of steps is identified by a sequence of digital fingerprints, with each digital fingerprint uniquely identifying its corresponding step. This sequence of fingerprints can be used to mine for matching patterns within incoming recordings, where the steps in the incoming recordings are also represented as sequence of fingerprints. The mining process refers to matching steps in pattern definition to steps in incoming recordings and determining whether the sequence of steps in a given recording matches the sequence of steps in the pattern definition.

Individual steps are determined to match or not match based on comparing their digital fingerprints. As discussed above, a digital fingerprint for a step can be created by encoding a subset of attributes for the step. However, in the case of pattern matching, not all the attributes within the subset are required for every pattern. The pattern definition for a given pattern can specify the attributes that should be utilized.

As some examples, consider a simplified set of attributes as the attributes encoded and included within the digital fingerprints for the steps. As an example, this simplified set of attributes can include: application_name; ui_control_type; ui_criteria_name; action_value; and input_value.

Consider a first simplified pattern to be mined that uses a sequence of two steps to copy data. The sequence of two steps is: (1) Right Click (opening a Menu); and (2) Left Click selecting Copy item in the Menu. For this pattern, it can be determined that the attribute "application_name" is not need when matching with this pattern because the sequence of steps is the same regardless of the application (e.g., Notepad, Excel, Word, etc.) involved.

Consider a second simplified pattern to be mined that uses a sequence of five steps to send an email. The sequence of five steps is: (1) Click Compose; (2) Add To; (3) Add Subject; (4) Add Message/Body; and (5) Click Send. For this pattern, the application name is needed for proper matching, but the attribute "input_value" which captures user-entered text is not needed when matching with this pattern. Here, although the entered text for the To, Subject or Message field of an email being composed varies from recording to recording, the sequence should still be identified as send email pattern.

Since not all the attributes within the subset of attributes used in generating digital fingerprints are required for every pattern, for purposes of pattern mining, the digital fingerprints can be modified to effectively exclude one or more attributes of the subset of attributes that were previously used to generate the digital fingerprints. This modification processing can be referred to as masking, whereby one or more attributes to be excluded can be masked out of the digital fingerprints. The masked fingerprints that result can be used in comparing sequences with one or more patterns. Hence, the similarity or difference of steps can be only based on the attributes required by the specific pattern and this set of attributes can be different for different patterns.

As noted, a pattern definition can specify set of attributes to be considered for comparing with its steps. In one implementation, the set of attributes can be determined manually by identifying those attributes that are important for the pattern identification. In another implementation, the set of attributes to be considered can be determined from pattern labeling of earlier recording by users. In this approach, identifying those attributes that are important for the pattern identification relies on pattern labeling provided by users. For example, when there is more than one labelling for a given pattern, then similarities and differences can be identified for the attribute values and this information can be used to derive the required attribute values for matching the given pattern.

For example, for the first simplified pattern discussed above, namely Right Click—Copy for copying data, three examples of previously labelled patterns that might have been associated with the first simplified pattern are as follows.

Labelled Pattern—1

[
{“application”: “excel”, “ui_control_type”: “textarea”, “ui_criteria_name’: “ “, “action_value”: “RIGHTCLICK”, “input_value’: “”},
{“application”: “excel”, “ui_control_type”: “textarea”, “ui_criteria_name’: “ “, “action_value”: “LEFTCLICK”, “input_value’: “Copy”}
]

Labelled Pattern—2

[
{“application”: “notepad”, “ui_control_type”: “textarea”, “ui_criteria_name’: “ “, “action_value”: “RIGHTCLICK”, “input_value’: “”},
{“application”: “notepad”, “ui_control_type”: “textarea”, “ui_criteria_name’: “ “, “action_value”: “LEFTCLICK”, “input_value’: “Copy”}
]

Labelled Pattern—3

[
{“application”: “word”, “ui_control_type”: “textarea”, “ui_criteria_name’: “ “, “action_value”: “RIGHTCLICK”, “input_value’: “”},
{“application”: “word”, “ui_control_type”: “textarea”, “ui criteria name’: “ “, “action value”: “LEFTCLICK”, “input value’: “Copy”}
]

Note that in the above three patterns, which all have been identified and labelled to belong to Right Click—Copy pattern, all the attributes except the attribute for “application” name contain the same set of values. Hence, it can be determined that value for attribute “application” name does not impact the “Right Click—Copy” pattern. Consequently, the “application” attribute can be masked and not considered for matching when mining for the “Right Click—Copy” pattern.

As another example, for the second simplified pattern discussed above, namely Send Email, for sending an email, three examples of patterns that might have been associated with the second simplified pattern are as follows.

Labelled Pattern—1

[
{“application”: “outlook”, “ui_control_type”: “button”, “ui_criteria_name’: “compose”, “action_value”: “RIGHTCLICK”, “input_value’: “”},
{“application”: “outlook”, “ui_control_type”: “textbox”, “ui_criteria_name’: “To”, “action_value”: “RIGHTCLICK”, “input_value’: “abc@gmail.com”},
{“application”: “outlook”, “ui_control_type”: “textbox”, “ui_criteria_name’: “subject”, “action_value”: “RIGHTCLICK”, “input_value’: “Invoice Document”}, -continued {“application”: “outlook”, “ui_control_type”: “textarea”, “ui_criteria_name’: “message”, “action_value”: “RIGHTCLICK”, “input_value’: “Data related to Invoice Document”},
{“application”: “outlook”, “ui_control_type”: “button”, “ui_criteria_name’: “send”, “action_value”: “RIGHTCLICK”, “input_value’: “”}
]

Labelled Pattern—2

[
{“application”: “outlook”, “ui_control_type”: “button”, “ui_criteria_name’: “compose”, “action_value”: “RIGHTCLICK”, “input_value’: “”},
{“application”: “outlook”, “ui_control_type”: “textbox”, “ui_criteria_name’: “To”, “action_value”: “RIGHTCLICK”, “input_value’: “xyz@yahoo.co.in”},
{“application”: “outlook”, “ui_control_type”: “textbox”, “ui_criteria_name’: “subject”, “action_value”: “RIGHTCLICK”, “input_value’: “Purchase Order”},
{“application”: “outlook”, “ui_control_type”: “textarea”, “ui_criteria_name’: “message”, “action_value”: “RIGHTCLICK”, “input_value’: “Purchase Order data”},
{“application”: “outlook”, “ui_control_type”: “button”, “ui_criteria_name’: “send”, “action_value”: “RIGHTCLICK”, “input_value’: “”}
]

Labelled Pattern—3

[
{“application”: “outlook”, “ui_control_type”: “button”, “ui_criteria_name’: “compose”, “action_value”: “RIGHTCLICK”, “input_value’: “”},
{“application”: “outlook”, “ui_control_type”: “textbox”, “ui_criteria_name’: “To”, “action_value”: “RIGHTCLICK”, “input_value’: “admin@abccorp.com”},
{“application”: “outlook”, “ui_control_type”: “textbox”, “ui_criteria_name’: “subject”, “action_value”: “RIGHTCLICK”, “input_value’: “Access Rights”},
{“application”: “outlook”, “ui_control_type”: “textarea”, “ui_criteria_name’: “message”, “action_value”: “RIGHTCLICK”, “input_value’: “Help with access rights”},
{“application”: “outlook”, “ui_control_type”: “button”, “ui_criteria_name’: “send”, “action_value”: “RIGHTCLICK”, “input_value’: “”}
]

Note that in the above three patterns, which all have been identified and labelled to belong to Send Email pattern, all the attributes except the “input_value” attribute contain the same set of values. Hence, it can be determined that value for “input_value” does not impact the “Send Email” pattern. Consequently, the “input_value” attribute can be masked and not considered for matching when mining for the “Send Email” pattern.

Figure 6:
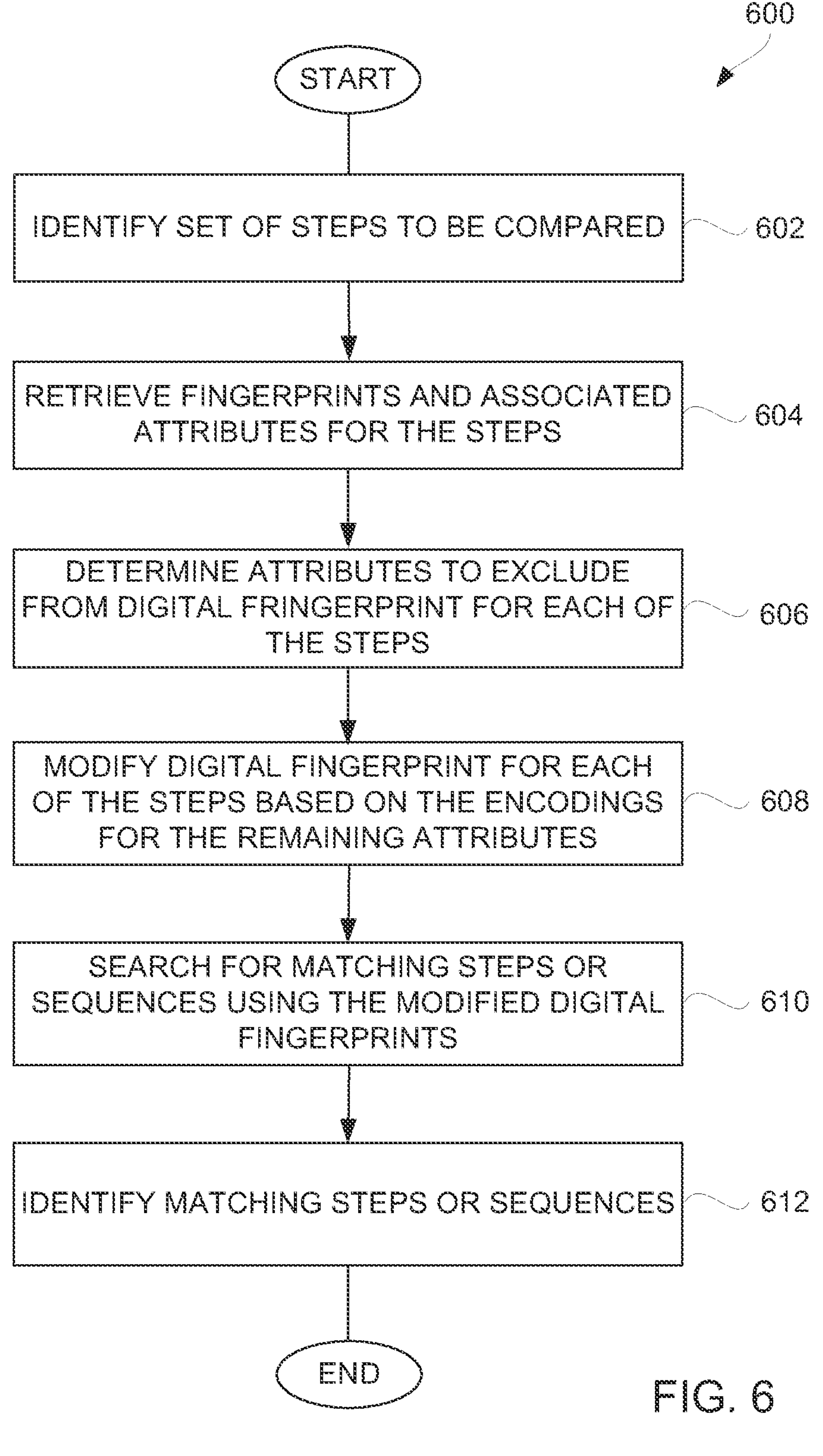
FIG. 6 is a flow diagram of a step matching process according to one embodiment.

FIG. 6 is a flow diagram of a step matching process 600 according to one embodiment. The step matching process 600 can, for example, be performed by a sequence mining subsystem 154 illustrated in FIG. 1B, or an RPA sequence mining system, such as the RPA sequence mining system 200 illustrated in FIG. 2A or the sequence mining system 250 illustrated in FIG. 2B.

The step matching process 600 can identify 602 a set of steps to be compared. The set of steps to be compared can be from a single recording or across multiple recordings. Next, a digital fingerprint and associated attributes for each of the steps can be retrieved 604. Typically, the digital fingerprint for each step has previously been generated from a subset of attributes and stored to memory (e.g., memory 104); hence, here the digital fingerprint and associated attributes for each step can be retrieved 604 from memory.

After the digital fingerprint and associated attributes have been retrieved 604 for each of the steps, the step matching process 600 can determine 606 one or more attributes to exclude from the digital fingerprint for each of the steps. In other words, each of the steps has a plurality of attributes associated therewith, but the digital fingerprint as previously generated was based on a subset of available attributes. Here, the one or more attributes to exclude from the digital fingerprint are chosen from the subset of available attributes. The one or more attributes to be excluded can be determined by empirical testing or machine learning.

Thereafter, the digital fingerprint for each of the steps can be modified 608 by utilizing only the encodings for the remaining attributes for a given step. By doing so, the resulting modified digital fingerprint for a given step will utilize only those attributes that are not excluded from consideration. The modification 608 being performed to the digital fingerprint can be implemented in various ways. In one implementation, the previously determined digital fingerprint (from the subset of attributes) can be modified by masking out the encodings therein that correspond to the one or more attributes being excluded. These masked out encodings can be eliminated from the modified digital fingerprint or can be replaced by a predetermined character, such as zeros. In generating or modifying a digital fingerprint, as noted above, the manner by which the encodings for attributes are combined can vary with implementation.

After the digital fingerprints have been modified 608 for each of the steps to be compared, the step matching process 600 can search 610 for matching steps or sequences (e.g., patterns) using the modified digital fingerprints. Any matching steps or sequences can then be identified 612. After the matching steps or sequences have been identified 612, the step matching process 600 can end. However, the matching steps or sequences can be utilized to enhance the operation of an RPA system such as in the locating of matching sequences in incoming recordings, discovery and/or creation of SAPs, or other purposes.

Figure 7A:
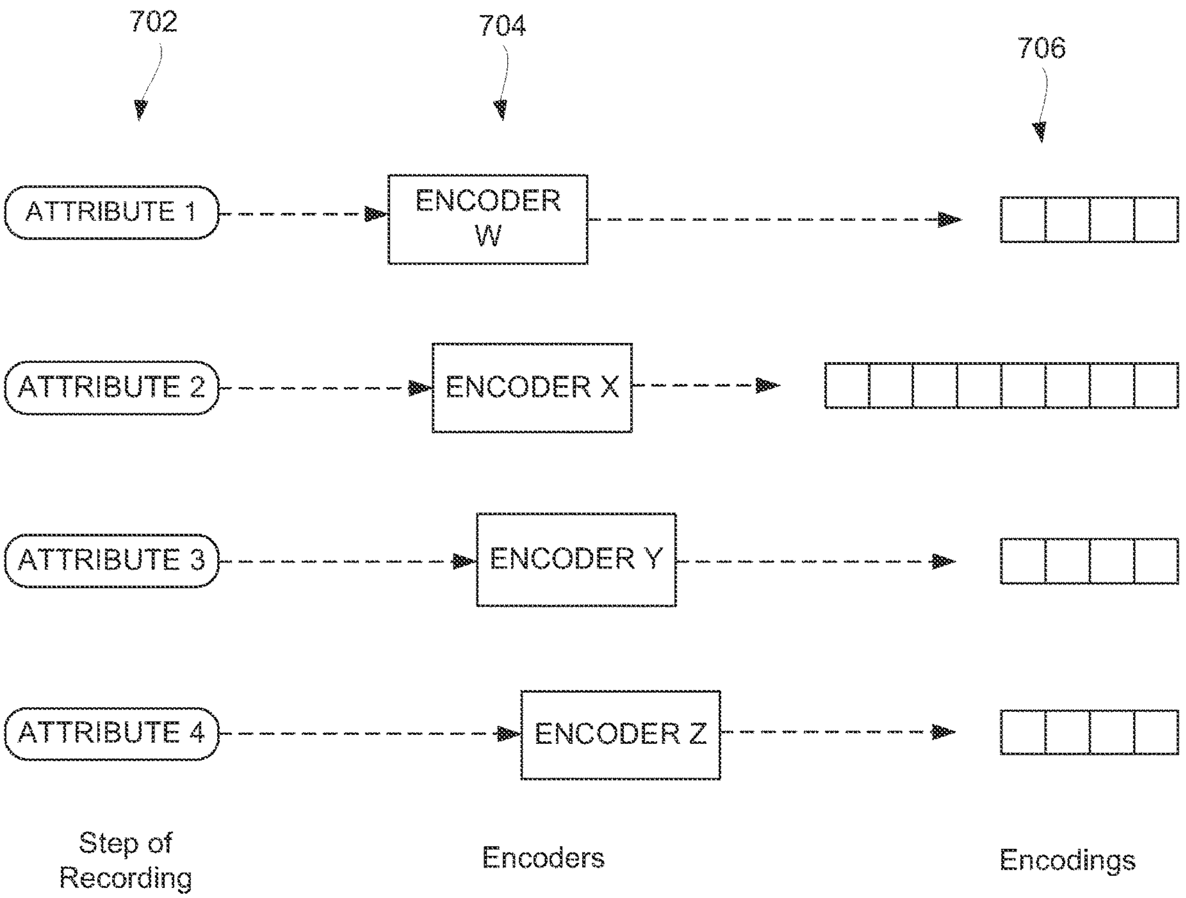
FIGS. 7A-7B depict processing diagrams illustrating exemplary processing of generating fingerprints for steps within a recording.
Figure 7B:
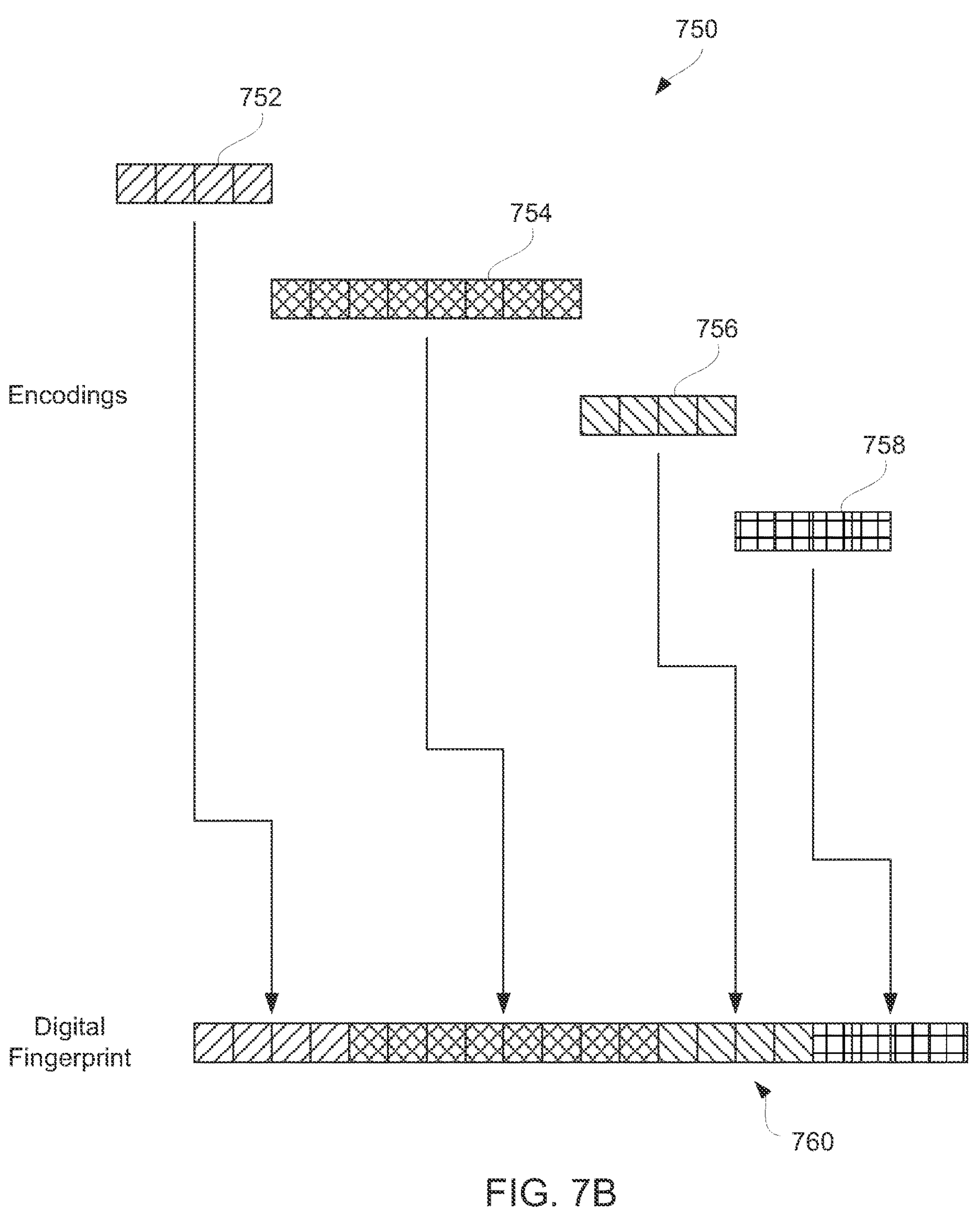

FIGS. 7A-7B depict processing diagrams illustrating exemplary processing of generating fingerprints for steps within a recording. These processing diagrams are exemplary and not intended to be limiting, as there are many different methods or embodiments for processing to generate fingerprints for steps within a recording.

FIG. 7A is a diagram of an exemplary attribute encoding formation 700 according to one embodiment. The attribute encoding formation 700 provides a simplified example of processing a particular step of a recording into a set of encodings. In this embodiment, the particular step of the recording has four attributes associate therewith. Generally speaking, the recording includes a sequence of user-initiated interactions that a user previously induced with regard to one or more application programs. These user-initiated interactions are denoted as steps. The user-initiated interactions, or steps, are typically click-level actions (e.g., individual low-level events) with respect to graphical user interfaces of one or more application programs.

The attribute encoding formation 700 receives a step 702 of a recording that is to be processed by the exemplary attribute encoding formation 700. The step 702 has a plurality of associated attributes that are descriptive of the corresponding step. These attributes, or a set thereof, can serve to identify a given step. In the example depicted in FIG. 7A, the step 702 has four attributes, denoted as attribute 1, attribute 2, attribute 3 and attribute 4. According to the exemplary attribute encoding formation 700, each of the attributes can potentially be encoded by a different encoder from a set of encoders 704. This allows for use of different encoders for different attributes. By this approach, the resulting encodings of the attributes can be more effective in providing identifiers for the associated step. As shown in FIG. 7A, the set of encoders 704 can include an encoder W, an encoder X, an encoder Y, and an encoder Z. In the depicted example shown in FIG. 7A, each of the plurality of attributes for the step 762 can be encoded by a different encoder. In particular, attribute 1 is encoded by encoder W, attribute 2 is encoded by encoder X, attribute 3 is encoded by encoder Y, and attribute 4 is encoded by encoder Z. The result from each of the encoders 704 is an encoding 706. Each of the encodings 706 is a digital value, such as a series of hexadecimal characters of a particular length. Since different encoders 704 are able to be used, the type of encoding being performed by the different encoders 704 can vary. Additionally, the length of the encodings 706 for each of the attributes need not be the same, and can thus also differ.

FIG. 7B is a diagram of an exemplary fingerprint formation 750 according to one embodiment. The fingerprint formation 750 receives encodings for a plurality of different attributes of a step of a recording. As denoted in FIG. 7B, the encodings include a first encoding 752, a second encoding 754, a third encoding 756, and a fourth encoding 758. These encodings 752-758 can, for example, be the encoding 706 produced by the attribute encoding formation 700 illustrated in FIG. 7A.

The fingerprint formation 750 can form a digital fingerprint 760 for the step of the recording. In the embodiment shown in FIG. 7B, the digital fingerprint 760 can be formed by joining together the individual encodings 752-758. For example, the individual encoding 752-758 can be concatenated together in a particular order to form the digital fingerprint 760. In this particular embodiment, the digital fingerprint 760 is formed by concatenating together the individual encodings 752-758, with the ordering of the first encoding 752, followed by the second encoding 754, followed by the third encoding 756, and finally followed by the fourth encoding 758.

Figure 8A:
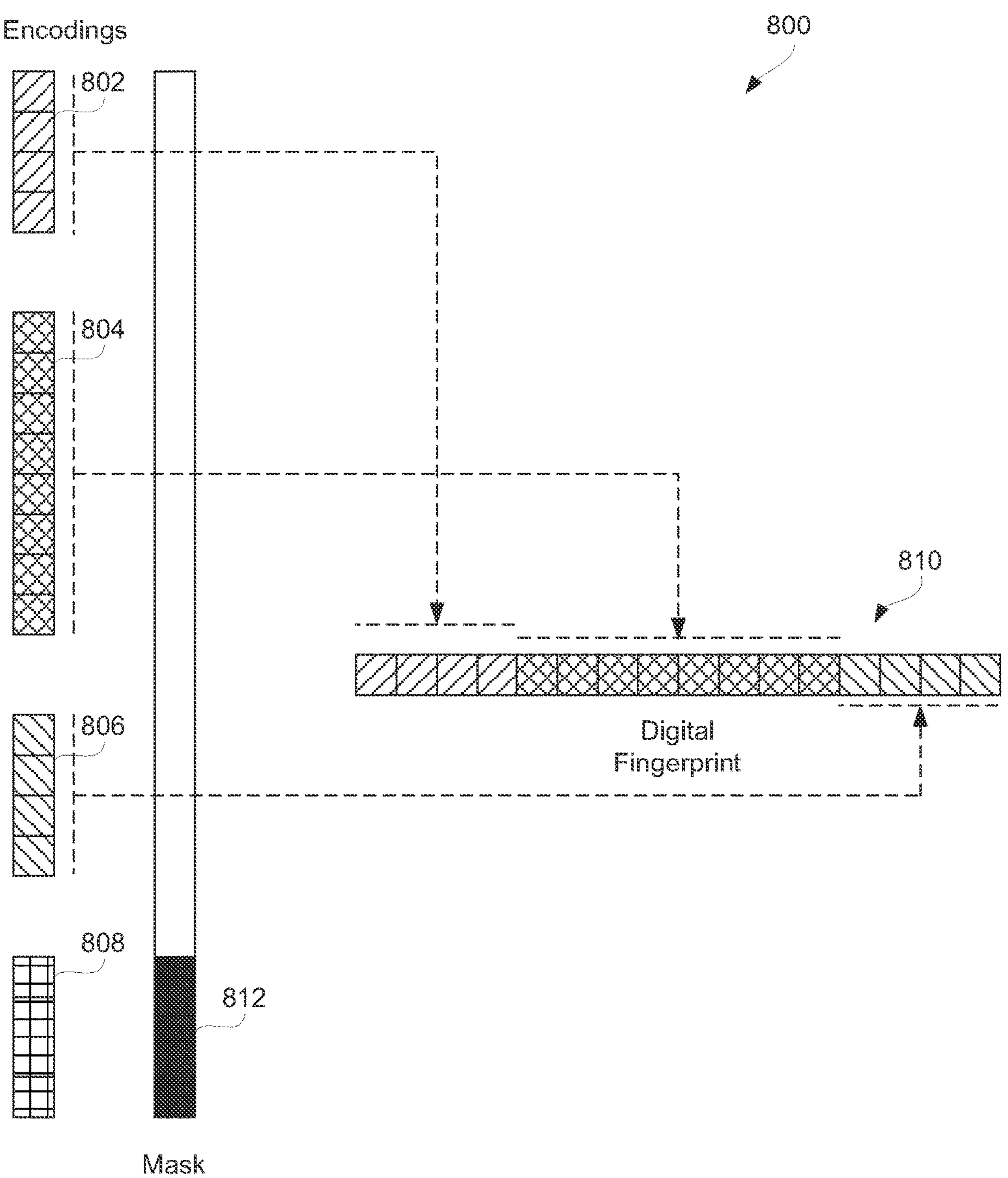
FIGS. 8A-8C depict processing diagrams illustrating exemplary processing of generating fingerprints for steps within a recording in which a mask is used.
Figure 8B:
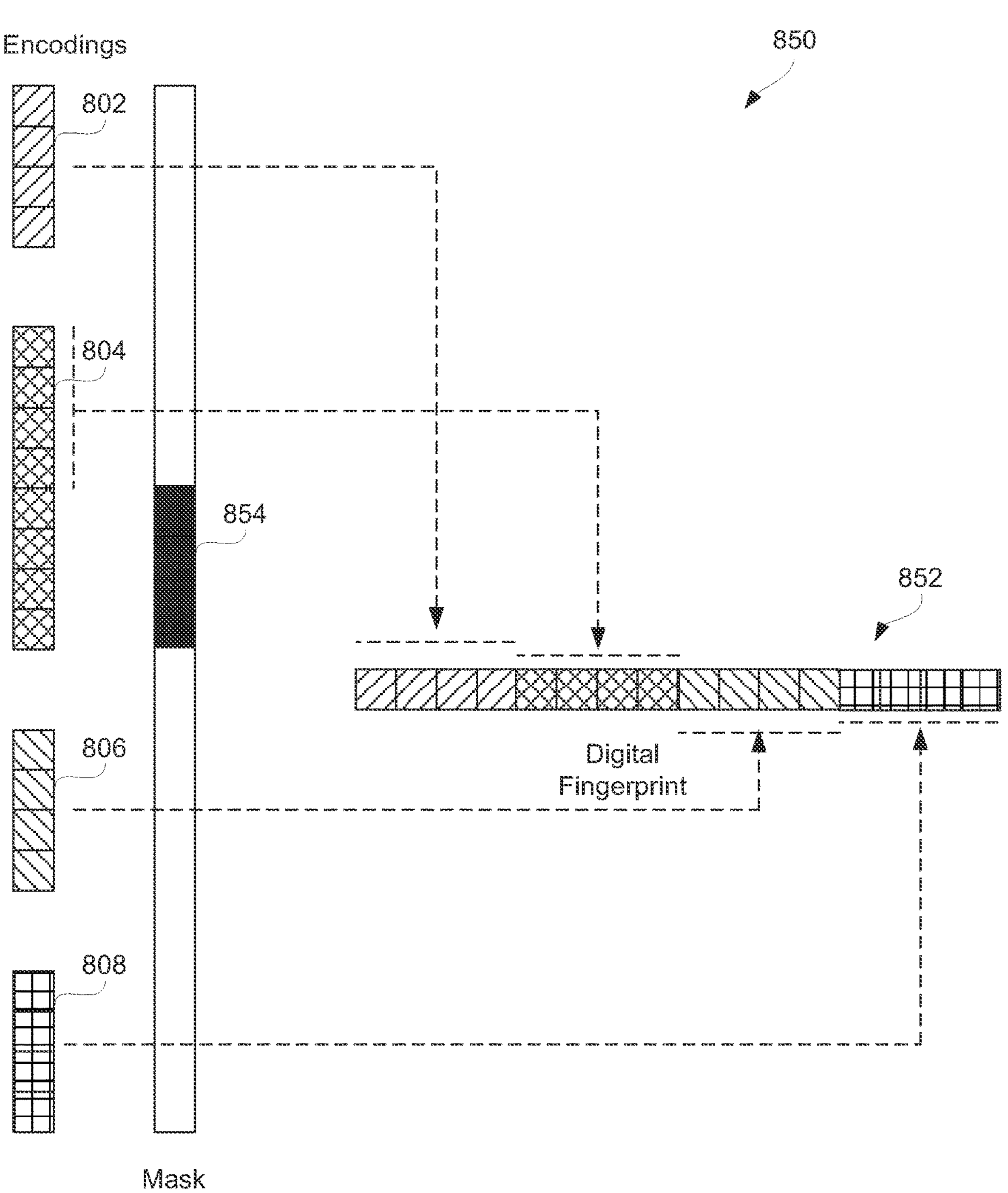
Figure 8C:
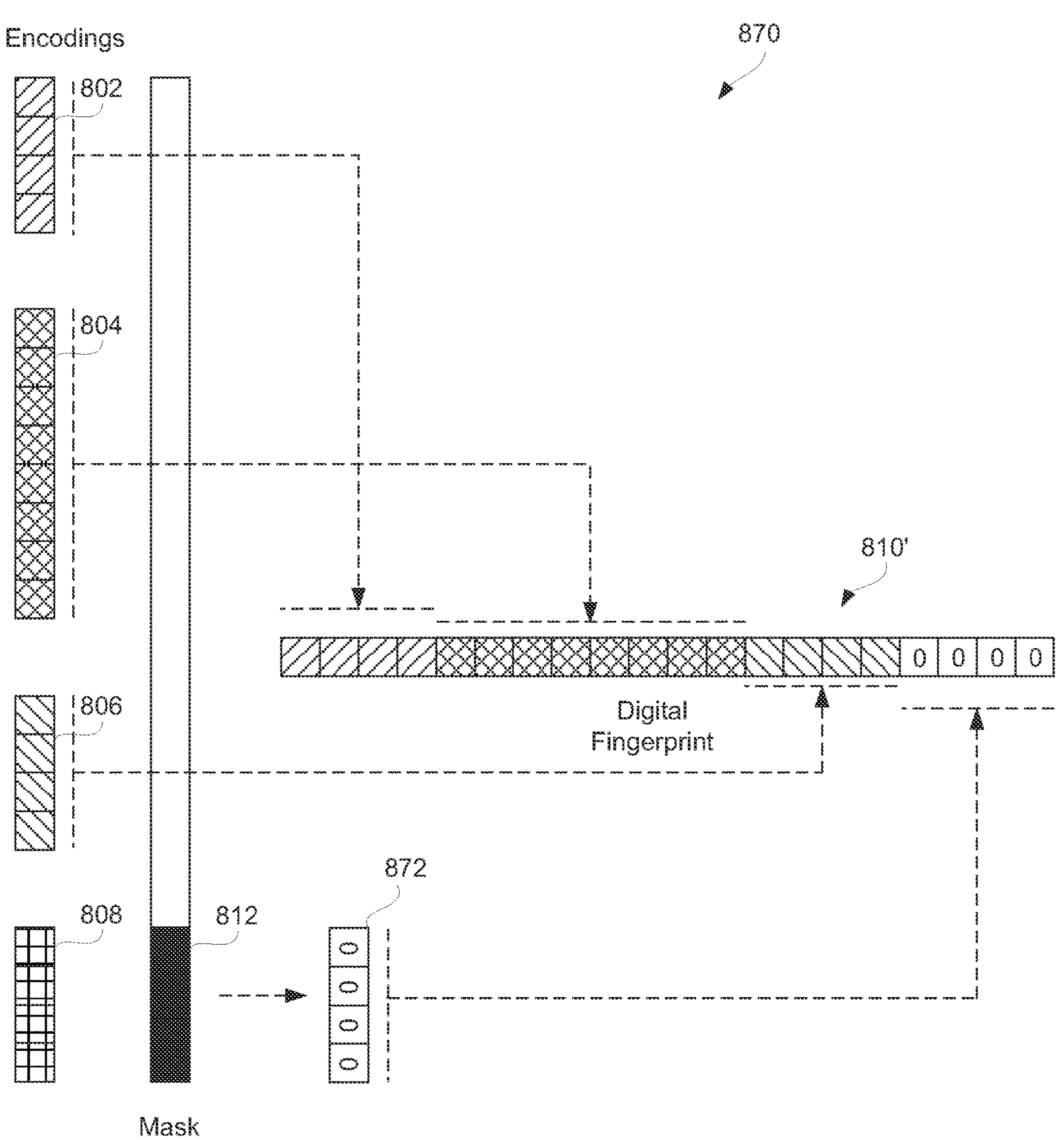

FIGS. 8A-8C depict processing diagrams illustrating exemplary processing of generating fingerprints for steps within a recording in which a mask is used. These processing diagrams are exemplary and not intended to be limiting, as processing to generate fingerprints for steps within a recording can proceed differently in other embodiments.

FIG. 8A is a diagram of an exemplary masked fingerprint formation 800 according to one embodiment. The exemplary masked fingerprint formation 800 forms a digital fingerprint generally similar to the fingerprint formation 750 illustrated in FIG. 7B.

The masked fingerprint formation 800 receives encodings for a plurality of different attributes of a step of a recording. As denoted in FIG. 8A, the encodings include a first encoding 802, a second encoding 804, a third encoding 806, and a fourth encoding 808. These encodings 802-808 can, for example, be encodings produced by the attribute encoding formation 700 illustrated in FIG. 7A.

The masked fingerprint formation 800 can form a digital fingerprint 810 for the step of the recording. In the embodiment shown in FIG. 8A, the digital fingerprint 810 can be formed by joining together one or more of the individual encodings 802-808. However, in this embodiment, a mask 812 is imposed to block certain attributes from being included in the digital fingerprint 810. In this example, the fourth encoding 808 has been chosen to be masked out and this not included in the digital fingerprint 810. For example, the individual encoding 802-806 can be concatenated together in a particular order to form the digital fingerprint 810. In this particular embodiment, the digital fingerprint 810 is formed by concatenating together the individual encodings 802-806, with the ordering of the first encoding 802, followed by the second encoding 804, and finally followed by the third encoding 806. Consequently, the mask 812 is applied to cause the fourth encoding 808 to not be used in forming the digital fingerprint 810. In this embodiment, the masked fourth encoding 808 is not included in the digital fingerprint 810. In another embodiment, the masked fourth encoding 808 is represented as zeros (e.g., FIG. 8C).

Although the digital fingerprint is illustrated as formed by concatenating the encodings 802-808 in that order, this is not intended to be limiting as the order of the encodings may vary. For example, the digital fingerprint may be formed by concatenating the encodings in the following order: third encoding 806, first encoding 802, fourth encoding 808, and second encoding 804. Thus, the order of the encodings may vary to vary the resulting digital fingerprint 812. The ordering for combining the encodings is also able to be configured.

FIG. 8B is a diagram of an exemplary masked fingerprint formation 850 according to another embodiment. The masked fingerprint formation 850 forms a digital fingerprint generally similar to the fingerprint formation 750 illustrated in FIG. 7B.

The masked fingerprint formation 850 receives encodings for a plurality of different attributes of a step of a recording. Similar to FIG. 8A, the received encodings include the first encoding 802, the second encoding 804, the third encoding 806, and the fourth encoding 808. Again, these encodings 802-808 can, for example, be the encoding produced by the attribute encoding formation 700 illustrated in FIG. 7A. The masked fingerprint formation 850 can form a digital fingerprint 852 for the step of the recording. In the embodiment shown in FIG. 8B, the digital fingerprint 852 can be formed by joining together one or more of the individual encodings 802-808. However, in this embodiment, a mask 854 is imposed to block certain attributes, or portions thereof, from being included in the digital fingerprint 852. In this example, a portion of the second encoding 804 has been chosen to be masked out and this not included in the digital fingerprint 852. The individual encodings 802-808 can be concatenated together in a particular order to form the digital fingerprint 852. In this particular embodiment, the digital fingerprint 852 is formed by concatenating together the individual encodings 802-808, with the ordering of the first encoding 802, followed by a portion (i.e., non-masked portion) of the second encoding 804, followed by the third encoding 806 and finally followed by the fourth encoding 808. Consequently, the mask 854 is applied to cause a portion of the second encoding 804 to not be used in forming the digital fingerprint 852.

FIG. 8C is a diagram of an exemplary masked fingerprint formation 870 according to one embodiment. The exemplary masked fingerprint formation 870 forms a digital fingerprint generally similar to the fingerprint formation 800 illustrated in FIG. 8A except that the masking it implemented by zeroing the portion of the fingerprint being masked.

Similar to the masked fingerprint formation 800 illustrated in FIG. 8A, the masked fingerprint formation 870 receives encodings for a plurality of different attributes of a step of a recording, namely, the first encoding 802, the second encoding 804, the third encoding 806, and the fourth encoding 808.

The masked fingerprint formation 870 can form a digital fingerprint 810' for the step of the recording. In the embodiment shown in FIG. 8C, the digital fingerprint 810' can be formed by joining together one or more of the individual encodings 802-808. However, in this embodiment, a mask 812 is imposed to block certain attributes from being included in the digital fingerprint 810'. In this example, the fourth encoding 808 has been chosen to be masked out and this not included in the digital fingerprint 810'. In this embodiment, the fourth encoding is instead replaced with zeros, as noted by a masked encoding 872. In this particular embodiment, the digital fingerprint 810' can be formed by concatenating together the individual encodings 802-806 as well as the masked encoding 872, with the ordering of the first encoding 802, followed by the second encoding 804, followed by the third encoding 806, and finally followed by the masked encoding 872. Consequently, the fourth encoding 808 is not used in the digital fingerprint 810'; instead, the masked encoding 872 is used in its place. The RPA system making use of the digital fingerprint 810' recognizes and understands that the presence of zeros signals that a portion of the digital fingerprint 810' to be ignored. Again, the order of the encodings may vary to vary the resulting digital fingerprint 810'. The ordering for combining the encodings is also able to be configured.

As previously noted, a recorder captures numerous attributes for each of various steps present in a recording. For digital fingerprints, a subset of these attributes can be used. While the subset can be determined manually, such as through trial and error, in other embodiments, the subset of the attributes can be dynamically chosen.

In one embodiment, a matching model can be chosen. From the matching model chosen, a subset of attributes can be choses. For example, matching models can be denoted as RELAXED, MODERATE, and STRICT. Typically, the MODERATE model would use more attributes that the RELAXED model, and the STRICT model will use more attributes than the MODERATE model.

Figure 9:
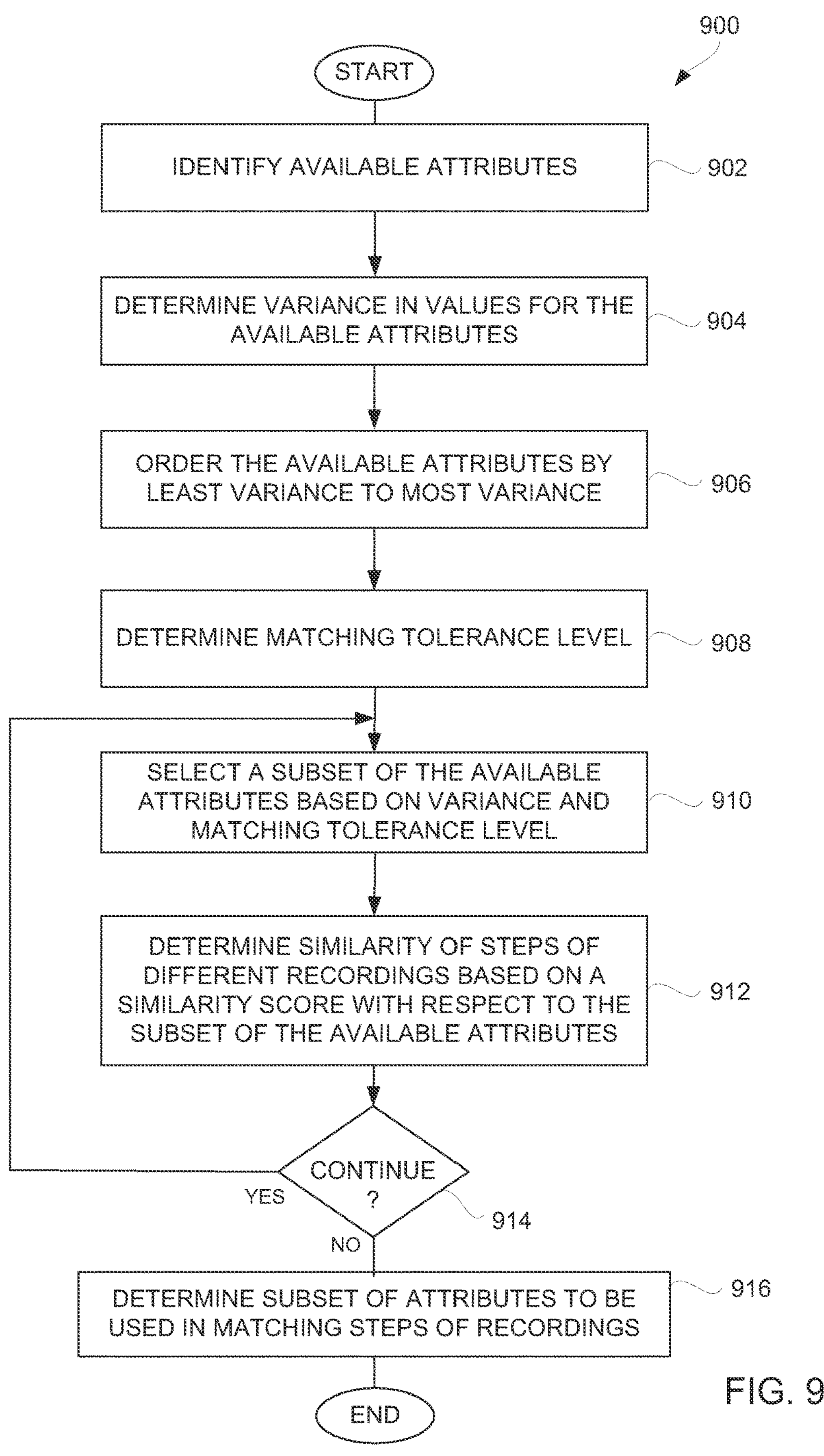
FIG. 9 is a flow diagram of a step similarity process according to one embodiment.

FIG. 9 is a flow diagram of a step similarity process 900 according to one embodiment. The step similarity process is, for example, performed by the RPA server 136 illustrated in FIG. 1A or the digital fingerprint subsystem 158 illustrated in FIG. 1B. The step similarity process 900 provides an automated approach to determining a subset of available attributes that are to be used in generating a digital fingerprint for a step within a recording. For example, the step similarity process 900 can be used to determined 306 a subset of attributes that are to be used in generating a digital fingerprint, such as in the fingerprint generation process 300 illustrated in FIG. 3.

The step similarity process 900 can initially identify 902 available attributes. The available attributes are those attributes that are acquired by a recorder when recordings are captured. Next, variance in values for the available attributes can be determined 904. Some attributes have only a finite set of possible values, while other attributes can have an almost unlimited number of possible values. In view of the wide range of variance in values, the available attributes can be ordered 906 by the least variance value to the most variance value.

In addition, the step similarity process 900 can determine 908 a matching tolerance level. The matching tolerance level indicates whether strict, moderate or relaxed tolerances is to be applied when performing similarity evaluations. Based on the matching tolerance level, a different number of attributes can be used, or different attributes can be preferred.

Still further, the step similarity process 900 can select 910 a subset of the available attributes based on variance and matching tolerance level. For example, from the ordered list of available attributes, a subset of the available attributes can be chosen such that attributes with less variance are preferred. Also, the matching tolerance level can impact the particular attributes to be selected or the number of attributes to be included in the subset of the available attributes. In one implementation, a strict matching tolerance level will use more attributes than a moderate matching tolerance level, and a moderate matching tolerance level will use more attributes than a relaxed matching tolerance level.

Finally, similarity between steps of different recordings can be determined 912 based on a similarity score with respect to the subset of available assets that have been selected 910. Following the determination of the similarity between steps, the step similarity process 900 is complete after having determine whether or not the steps being compared are to be deemed similar or not. The similarity score between two steps being compared can be compared to a threshold to decide whether the steps are sufficiently similar to be considered equivalent. If the steps are deemed to be similar, they can be treated as equivalent with respect to matching of steps, which can be also used in matching sequences or patterns of steps.

Next, a decision 914 can determine whether the step similarity process 900 should continue. If the step similarity process 900 is to continue, the processing returns to select 910 so that another subset of the available attributes can be chosen and used in determination 912 of similarity of different steps in different recordings. Alternatively, when the decision 914 determines that the step similarity process 900 is done with similarity evaluation and a subset of the available attributes are determined, then the subset of attributes to be used in matching steps within various recordings can be denoted 916. The subset of attributes being denoted 916 can be those of the available attributes that are to be used in generating digital fingerprints. Following denoting 916 the subset of attributes, the step similarity process 900 can end.

In one embodiment, machine learning can be used to determine the more useful attributes for matching, especially for similarity matching. A subset of attributes to be used can be selected from a list of available attributes. An attribute map can be formed for the list of attributes. According to one embodiment, operations to form an attribute map are as follows.

First, compute statistics on variance of attributes for the selected list of recordings. For example, identify a number of distinct values for the attributes used across the recordings.

Second, sort the list of available attributes by variance. Those attributes with less variance are more useful in grouping or matching steps in recordings. For example, the following table denotes a few attributes and an amount of variance found across a plurality of recordings.

| Attribute | # of distinct values |
|---|---|
| Application | 3 |
| Action Name | 3 |
| Action Value | 4 |
| UI Criteria Name | 7 |
| Path (DOM) | 12 |

Third, choose those of the attributes in the sorted list of available attributes that have more than one distinct value. Then, from the sorted list, pick a number of attributes for the subset of attributes to be used. The number of attributes being picked can be dependent on the matching model chosen. For example, with a RELAXED model being used, the number of attributes chosen could be three, and in such case, the attributes chosen, in this example, would be: Application, Action Name, and Action Value.

Fourth, after the subset of attributes have been chosen, weights for the chosen attributes can be selected. For the subset of attributes, the individual weights are from zero (0) to one (1), and sum of all the weights must equal to one (1). In one implementation, weights can be determined by comparing results for collected data with varying weights.

Fifth, a threshold to be used for computing equality of steps based on a weighted similarity score can be chosen. For example, step A from Recording 1 and step B from Recording 2 can be considered equal if a similarity score between the two steps based on the chosen subset of attributes is greater than 0.8. The similarity score can be computed and then compared against a threshold to determine if step A and step B are deemed the same (i.e., substantially similar). In one embodiment, the similarity score can be determined as follows:

$$\text{weighted Score } Sab=\Sigma\text{distance}(ai,bi)*wi,$$

wherein ai is value of attribute from step A, bi is value of attribute from step B, and wi is the weight for the attribute i. Then, step A and step B are considered similar is the weighted score Sab is greater than a threshold.

All attributes are not equal and based on the type of application and the technology used to capture events, the confidence level on attributes varies. In one embodiment, to account for varying confidence levels, the weights for each attribute used for fingerprinting can be learned, such as by machine learning from customer data.

To determine similarity between two steps, the similarity of attribute values for all chosen attributes for the fingerprints are computed. For example, if application, action name, action value are the chosen attributes, then values of those attributes for step A in Recording 1 and step B in Recording 2 need to compared.

| Attribute | Recording 1 | Recording 2 | Distance Type | Distance | Similarity | Weight | Score |
|---|---|---|---|---|---|---|---|
| Application | Chrome | Iexplorer | Predefined | 0 | 0.9 | 0.3 | 0.27 |
| Action Name | clientAction | buttonAction | Enum - Exact Match | 0.8 | 0.2 | 0.2 | 0.04 |

-continued

| Attribute | Recording 1 | Recording 2 | Distance Type | Distance | Similarity | Weight | Score |
|---|---|---|---|---|---|---|---|
| Action Value | LEFTCLICK | SETTEXT | Enum - Exact Match | 1 | 0 | 0.2 | 0 |
| UI Criteria Name | Book2 | Book2 - Excel | Token Distance | 0.2 | 0.8 | 0.2 | 0.16 |
| Path (DOM) | //div[@id='rso' ]/div[1]/div[1]/ div[1]/div[1]/di v[1]/div[1]/div [1]/div[3]/div[ 1]/div[1]/input[ 1] | //div[@id='rso' ]/div[1]/div[1]/ div[1]/div[1]/di v[1]/div[1]/div [1]/div[3]/div[ 3]/div[1]/div[1 ]/input[1] | Path Distance | 0.3 | 0.7 | 0.1 | 0.07 |
| | | | | | Weighted score | | 0.54 |

To determine similarity between two steps, the similarity of attribute values for all chosen attributes for the fingerprints are computed. For example, if application, action name, action value are the chosen attributes, then values of those attributes for step A in Recording 1 and step B in Recording 2 need to compared.

The various aspects disclosed herein can be utilized with or by robotic process automation systems. Exemplary robotic process automation systems and operations thereof are detailed below.

Figure 10:
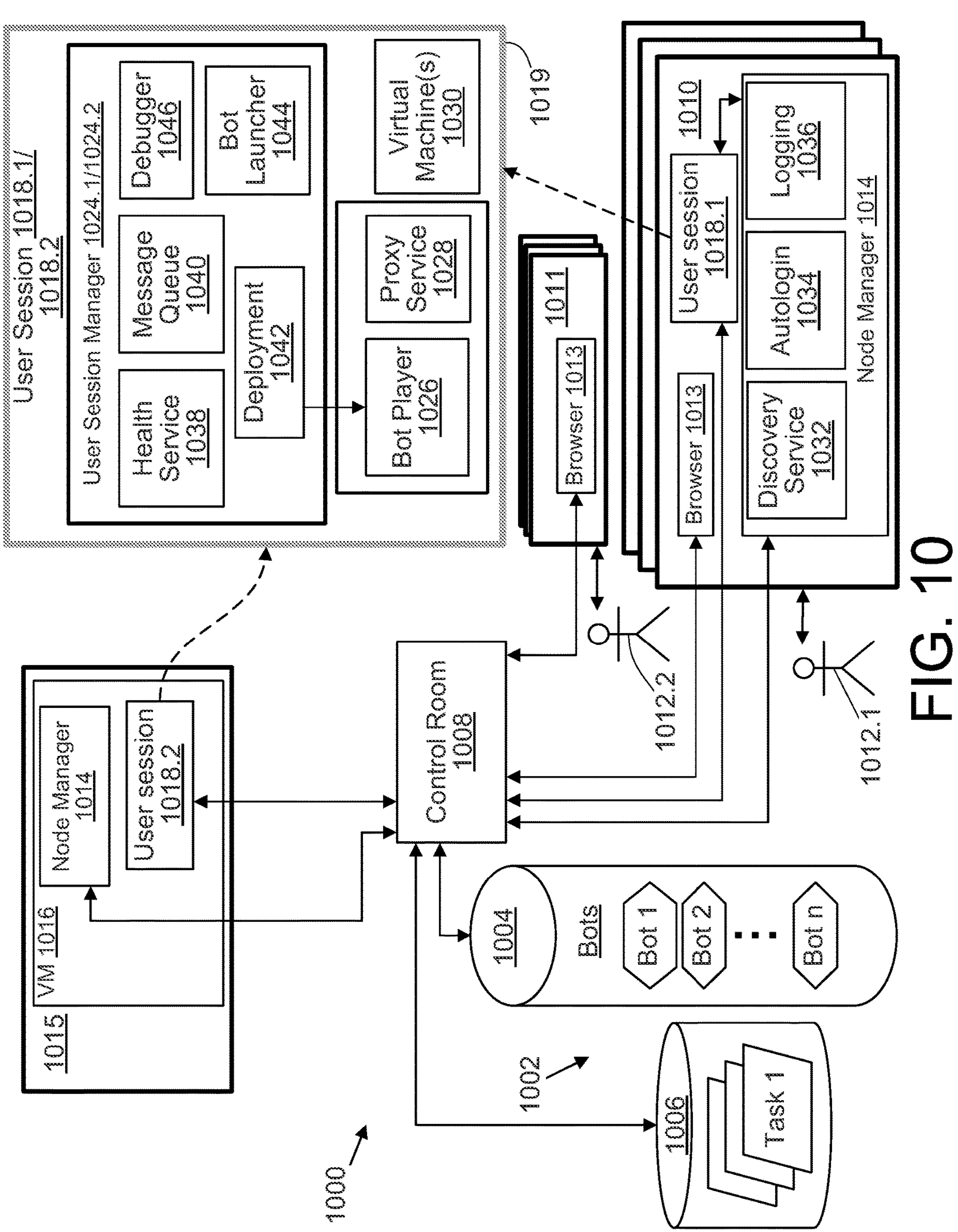
FIG. 10 is a block diagram of a robotic process automation (RPA) system according to one embodiment.

FIG. 10 is a block diagram of a robotic process automation (RPA) system 1000 according to one embodiment. The RPA system 1000 includes data storage 1002. The data storage 1002 can store a plurality of software robots 1004, also referred to as bots (e.g., Bot 1, Bot 2, . . . , Bot n, where n is an integer). The software robots 1004 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 1026), on which a bot will execute or is executing. The data storage 1002 can also stores a plurality of work items 1006. Each work item 1006 can pertain to processing executed by one or more of the software robots 1004.

The RPA system 1000 can also include a control room 1008. The control room 1008 is operatively coupled to the data storage 1002 and is configured to execute instructions that, when executed, cause the RPA system 1000 to respond to a request from a client device 1010 that is issued by a user 1012.1. The control room 1008 can act as a server to provide to the client device 1010 the capability to perform an automation task to process a work item from the plurality of work items 1006. The RPA system 1000 is able to support multiple client devices 1010 concurrently, each of which will have one or more corresponding user session(s) 1018, which provides a context. The context can, for example, include security, permissions, audit trails, etc. to define the permissions and roles for bots operating under the user session 1018. For example, a bot executing under a user session, cannot access any files or use any applications that the user, under whose credentials the bot is operating, does not have permission to do so. This prevents any inadvertent or malicious acts from a bot under which bot 1004 executes.

The control room 1008 can provide, to the client device 1010, software code to implement a node manager 1014. The node manager 1014 executes on the client device 1010 and provides a user 1012 a visual interface via browser 1013 to view progress of and to control execution of automation tasks. It should be noted that the node manager 1014 can be provided to the client device 1010 on demand, when required by the client device 1010, to execute a desired automation task. In one embodiment, the node manager 1014 may remain on the client device 1010 after completion of the requested automation task to avoid the need to download it again. In another embodiment, the node manager 1014 may be deleted from the client device 1010 after completion of the requested automation task. The node manager 1014 can also maintain a connection to the control room 1008 to inform the control room 1008 that device 1010 is available for service by the control room 1008, irrespective of whether a live user session 1018 exists. When executing a bot 1004, the node manager 1014 can impersonate the user 1012 by employing credentials associated with the user 1012.

The control room 1008 initiates, on the client device 1010, a user session 1018 (seen as a specific instantiation 1018.1) to perform the automation task. The control room 1008 retrieves the set of task processing instructions 1004 that correspond to the work item 1006. The task processing instructions 1004 that correspond to the work item 1006 can execute under control of the user session 1018.1, on the client device 1010. The node manager 1014 can provide update data indicative of status of processing of the work item to the control room 1008. The control room 1008 can terminate the user session 1018.1 upon completion of processing of the work item 1006. The user session 1018.1 is shown in further detail at 1019, where an instance 1024.1 of user session manager 1024 is seen along with a bot player 1026, proxy service 1028, and one or more virtual machine(s) 1030, such as a virtual machine that runs Java® or Python®. The user session manager 1024 provides a generic user session context within which a bot 1004 executes.

The bots 1004 execute on a bot player, via a computing device, to perform the functions encoded by the bot. Some or all of the bots 1004 may, in certain embodiments, be located remotely from the control room 1008. Moreover, the devices 1010 and 1011, which may be conventional computing devices, such as for example, personal computers, server computers, laptops, tablets and other portable computing devices, may also be located remotely from the control room 1008. The devices 1010 and 1011 may also take the form of virtual computing devices. The bots 1004 and the work items 1006 are shown in separate containers for purposes of illustration but they may be stored in separate or the same device(s), or across multiple devices.

The control room 1008 can perform user management functions, source control of the bots 1004, along with providing a dashboard that provides analytics and results of the bots 1004, performs license management of software required by the bots 1004 and manages overall execution and management of scripts, clients, roles, credentials, security, etc. The major functions performed by the control room 1008 can include: (i) a dashboard that provides a summary of registered/active users, tasks status, repository details, number of clients connected, number of scripts passed or failed recently, tasks that are scheduled to be executed and those that are in progress, and any other desired information; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 1008 is shown generally for simplicity of explanation. Multiple instances of the control room 1008 may be employed where large numbers of bots are deployed to provide for scalability of the RPA system 1000.

In the event that a device, such as device 1011 (e.g., operated by user 1012.2) does not satisfy the minimum processing capability to run a node manager 1014, the control room 1008 can make use of another device, such as device 1015, that has the requisite capability. In such case, a node manager 1014 within a Virtual Machine (VM), seen as VM 1016, can be resident on the device 1015. The node manager 1014 operating on the device 1015 can communicate with browser 1013 on device 1011. This approach permits RPA system 1000 to operate with devices that may have lower processing capability, such as older laptops, desktops, and portable/mobile devices such as tablets and mobile phones. In certain embodiments the browser 1013 may take the form of a mobile application stored on the device 1011. The control room 1008 can establish a user session 1018.2 for the user 1012.2 while interacting with the control room 1008 and the corresponding user session 1018.2 operates as described above for user session 1018.1 with user session manager 1024 operating on device 1010 as discussed above.

In certain embodiments, the user session manager 1024 provides five functions. First is a health service 1038 that maintains and provides a detailed logging of bot execution including monitoring memory and CPU usage by the bot and other parameters such as number of file handles employed. The bots 1004 can employ the health service 1038 as a resource to pass logging information to the control room 1008. Execution of the bot is separately monitored by the user session manager 1024 to track memory, CPU, and other system information. The second function provided by the user session manager 1024 is a message queue 1040 for exchange of data between bots executed within the same user session 1018. The third function is a deployment service (also referred to as a deployment module) 1042 that connects to the control room 1008 to request execution of a requested bot 1004. The deployment service 1042 can also ensure that the environment is ready for bot execution, such as by making available dependent libraries. The fourth function is a bot launcher 1044 which can read metadata associated with a requested bot 1004 and launch an appropriate container and begin execution of the requested bot. The fifth function is a debugger service 1046 that can be used to debug bot code.

The bot player 1026 can execute, or play back, a sequence of instructions encoded in a bot. The sequence of instructions can, for example, be captured by way of a recorder when a human performs those actions, or alternatively the instructions are explicitly coded into the bot. These instructions enable the bot player 1026, to perform the same actions as a human would do in their absence. In one implementation, the instructions can compose of a command (or action) followed by set of parameters. For example, Open Browser is a command and a URL would be the parameter for it to launch a web resource. Proxy service 1028 can enable integration of external software or applications with the bot to provide specialized services. For example, an externally hosted artificial intelligence system can enable the bot to understand the meaning of a "sentence."

The user 1012.1 can interact with node manager 1014 via a conventional browser 1013 which employs the node manager 1014 to communicate with the control room 1008. When the user 1012.1 logs in from the client device 1010 to the control room 1008 for the first time, the user 1012.1 can be prompted to download and install the node manager 1014 on the device 1010, if one is not already present. The node manager 1014 can establish a web socket connection to the user session manager 1024, deployed by the control room 1008 that lets the user 1012.1 subsequently create, edit, and deploy the bots 1004.

Figure 11:
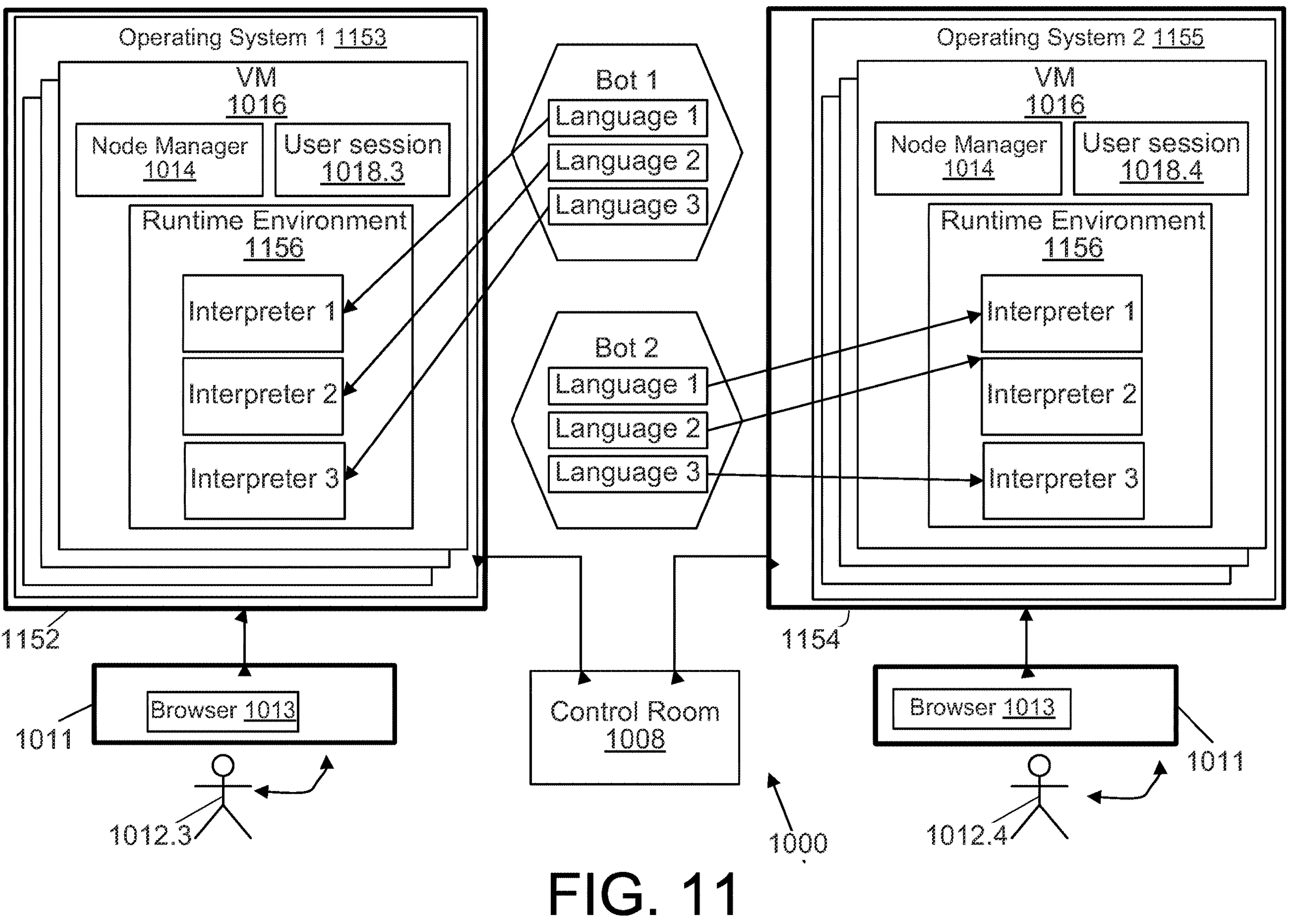
FIG. 11 is a block diagram of a generalized runtime environment for bots in accordance with another embodiment of the RPA system illustrated in FIG. 10.

FIG. 11 is a block diagram of a generalized runtime environment for bots 1004 in accordance with another embodiment of the RPA system 1000 illustrated in FIG. 10. This flexible runtime environment advantageously permits extensibility of the platform to enable use of various languages in encoding bots. In the embodiment of FIG. 11, RPA system 1000 generally operates in the manner described in connection with FIG. 10, except that in the embodiment of FIG. 11, some or all of the user sessions 1018 execute within a virtual machine 1016. This permits the bots 1004 to operate on an RPA system 1000 that runs on an operating system different from an operating system on which a bot 1004 may have been developed. For example, if a bot 1004 is developed on the Windows® operating system, the platform agnostic embodiment shown in FIG. 11 permits the bot 1004 to be executed on a device 1152 or 1154 executing an operating system 1153 or 1155 different than Windows®, such as, for example, Linux. In one embodiment, the VM 1016 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 11, multiple devices 1152 can execute operating system 1, 1153, which may, for example, be a Windows® operating system. Multiple devices 1154 can execute operating system 2, 1155, which may, for example, be a Linux® operating system. For simplicity of explanation, two different operating systems are shown, by way of example and additional operating systems such as the macOS®, or other operating systems may also be employed on devices 1152, 1154 or other devices. Each device 1152, 1154 has installed therein one or more VM's 1016, each of which can execute its own operating system (not shown), which may be the same or different than the host operating system 1153/1155. Each VM 1016 has installed, either in advance, or on demand from control room 1008, a node manager 1014. The embodiment illustrated in FIG. 11 differs from the embodiment shown in FIG. 10 in that the devices 1152 and 1154 have installed thereon one or more VMs 1016 as described above, with each VM 1016 having an operating system installed that may or may not be compatible with an operating system required by an automation task. Moreover, each VM has installed thereon a runtime environment 1156, each of which has installed thereon one or more interpreters (shown as interpreter 1, interpreter 2, interpreter 3). Three interpreters are shown by way of example but any run time environment 1156 may, at any given time, have installed thereupon less than or more than three different interpreters. Each interpreter 1156 is specifically encoded to interpret instructions encoded in a particular programming language. For example, interpreter 1 may be encoded to interpret software programs encoded in the Java® programming language, seen in FIG. 11 as language 1 in Bot 1 and Bot 2. Interpreter 2 may be encoded to interpret software programs encoded in the Python® programming language, seen in FIG. 11 as language 2 in Bot 1 and Bot 2, and interpreter 3 may be encoded to interpret software programs encoded in the R programming language, seen in FIG. 11 as language 3 in Bot 1 and Bot 2.

Turning to the bots Bot 1 and Bot 2, each bot may contain instructions encoded in one or more programming languages. In the example shown in FIG. 11, each bot can contain instructions in three different programming languages, for example, Java®, Python® and R. This is for purposes of explanation and the embodiment of FIG. 11 may be able to create and execute bots encoded in more or less than three programming languages. The VMs 1016 and the runtime environments 1156 permit execution of bots encoded in multiple languages, thereby permitting greater flexibility in encoding bots. Moreover, the VMs 1016 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 1008 will select a device with a VM 1016 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 12:
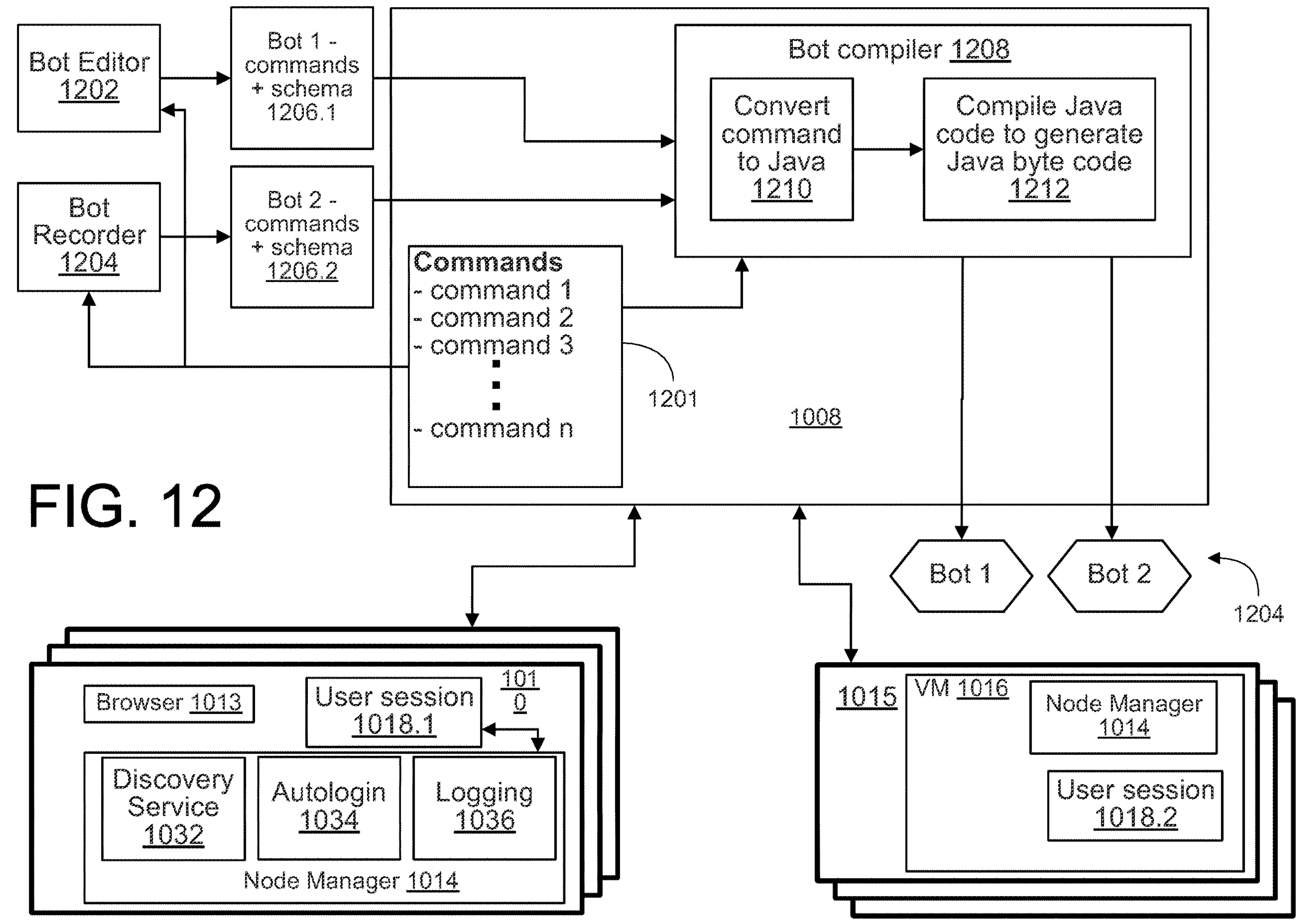
FIG. 12 illustrates yet another embodiment of the RPA system of FIG. 10 configured to provide platform independent sets of task processing instructions for bots.

FIG. 12 illustrates a block diagram of yet another embodiment of the RPA system 1000 of FIG. 10 configured to provide platform independent sets of task processing instructions for bots 1004. Two bots 1004, bot 1 and bot 2 are shown in FIG. 12. Each of bots 1 and 2 are formed from one or more commands 1201, each of which specifies a user level operation with a specified application program, or a user level operation provided by an operating system. Sets of commands 1206.1 and 1206.2 may be generated by bot editor 1202 and bot recorder 1204, respectively, to define sequences of application-level operations that are normally performed by a human user. The bot editor 1202 may be configured to combine sequences of commands 1201 via an editor. The bot recorder 1204 may be configured to record application-level operations performed by a user and to convert the operations performed by the user to commands 1201. The sets of commands 1206.1 and 1206.2 generated by the editor 1202 and the recorder 1204 can include command(s) and schema for the command(s), where the schema defines the format of the command(s). The format of a command can, such as, includes the input(s) expected by the command and their format. For example, a command to open a URL might include the URL, a user login, and a password to login to an application resident at the designated URL.

The control room 1008 operates to compile, via compiler 1208, the sets of commands generated by the editor 1202 or the recorder 1204 into platform independent executables, each of which is also referred to herein as a bot JAR (Java ARchive) that perform application-level operations captured by the bot editor 1202 and the bot recorder 1204. In the embodiment illustrated in FIG. 12, the set of commands 1206, representing a bot file, can be captured in a JSON (JavaScript Object Notation) format which is a lightweight data-interchange text-based format. JSON is based on a subset of the JavaScript Programming Language Standard ECMA-262 3rd Edition—December 1999. JSON is built on two structures: (i) a collection of name/value pairs; in various languages, this is realized as an object, record, struct, dictionary, hash table, keyed list, or associative array, (ii) an ordered list of values which, in most languages, is realized as an array, vector, list, or sequence. Bots 1 and 2 may be executed on devices 1010 and/or 1015 to perform the encoded application-level operations that are normally performed by a human user.

Figure 13:
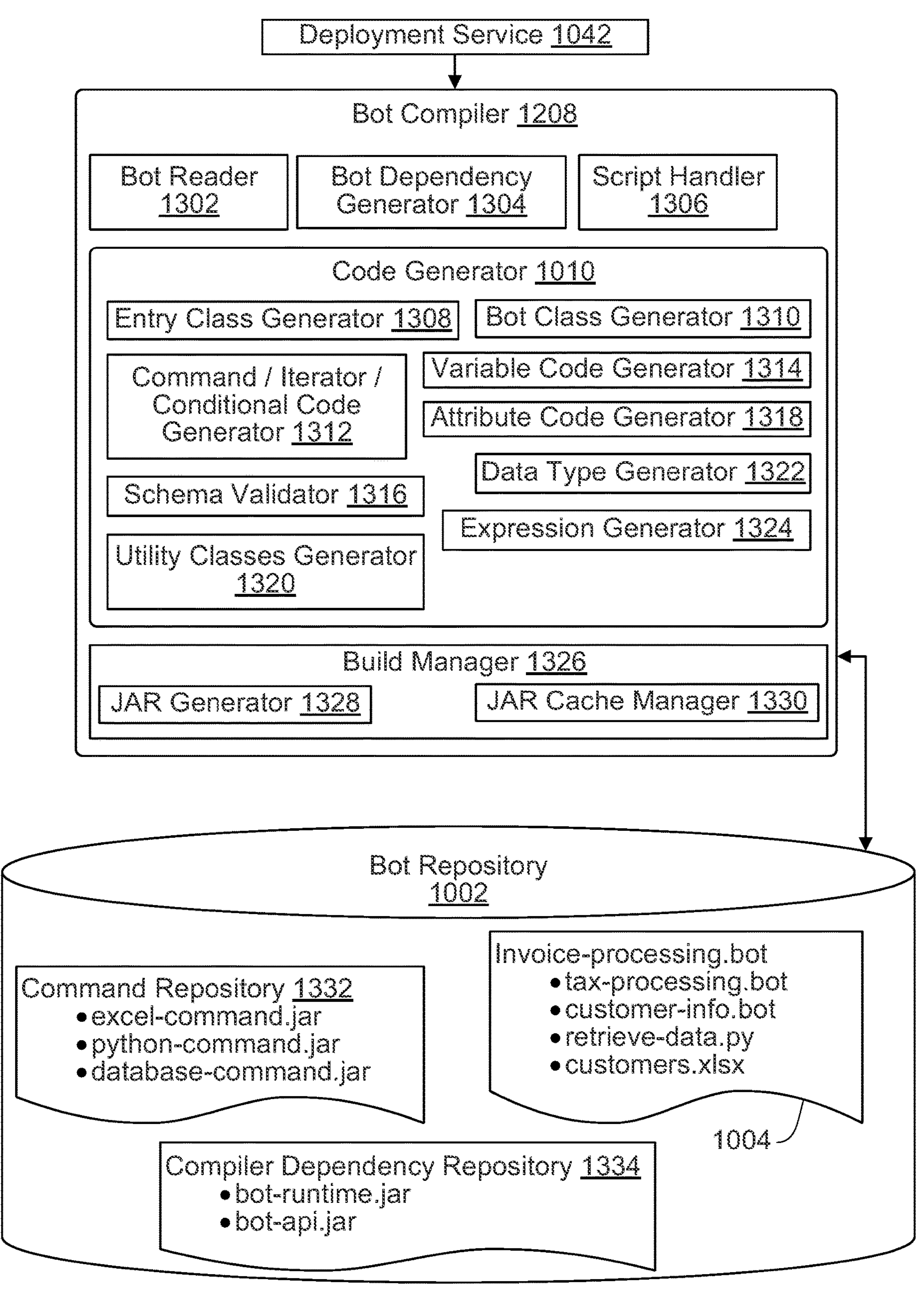
FIG. 13 is a block diagram illustrating details of one embodiment of the bot compiler illustrated in FIG. 12.

FIG. 13 is a block diagram illustrating details of one embodiment of the bot compiler 1208 illustrated in FIG. 12. The bot compiler 1208 accesses one or more of the bots 1004 from the data storage 1002, which can serve as bot repository, along with commands 1201 that are contained in a command repository 1332. The bot compiler 1008 can also access compiler dependency repository 1334. The bot compiler 1008 can operate to convert each command 1201 via code generator module 1210 to an operating system independent format, such as a Java command. The bot compiler 1008 then compiles each operating system independent format command into byte code, such as Java byte code, to create a bot JAR. The convert command to Java module 1210 is shown in further detail in in FIG. 13 by JAR generator 1328 of a build manager 1326. The compiling to generate Java byte code module 1212 can be provided by the JAR generator 1328. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 12, deployment service 1042 can be responsible to trigger the process of bot compilation and then once a bot has compiled successfully, to execute the resulting bot JAR on selected devices 1010 and/or 1015. The bot compiler 1208 can comprises a number of functional modules that, when combined, generate a bot 1004 in a JAR format. A bot reader 1302 loads a bot file into memory with class representation. The bot reader 1302 takes as input a bot file and generates an in-memory bot structure. A bot dependency generator 1304 identifies and creates a dependency graph for a given bot. It includes any child bot, resource file like script, and document or image used while creating a bot. The bot dependency generator 1304 takes, as input, the output of the bot reader 1302 and provides, as output, a list of direct and transitive bot dependencies. A script handler 1306 handles script execution by injecting a contract into a user script file. The script handler 1306 registers an external script in manifest and bundles the script as a resource in an output JAR. The script handler 1306 takes, as input, the output of the bot reader 1302 and provides, as output, a list of function pointers to execute different types of identified scripts like Python, Java, VB scripts.

An entry class generator 1308 can create a Java class with an entry method, to permit bot execution to be started from that point. For example, the entry class generator 1308 takes, as an input, a parent bot name, such "Invoice-processing-.bot" and generates a Java class having a contract method with a predefined signature. A bot class generator 1310 can generate a bot class and orders command code in sequence of execution. The bot class generator 1310 can take, as input, an in-memory bot structure and generates, as output, a Java class in a predefined structure. A Command/Iterator/Conditional Code Generator 1312 wires up a command class with singleton object creation, manages nested command linking, iterator (loop) generation, and conditional (If/Else If/Else) construct generation. The Command/Iterator/Conditional Code Generator 1312 can take, as input, an in-memory bot structure in JSON format and generates Java code within the bot class. A variable code generator 1314 generates code for user defined variables in the bot, maps bot level data types to Java language compatible types, and assigns initial values provided by user. The variable code generator 1314 takes, as input, an in-memory bot structure and generates Java code within the bot class. A schema validator 1316 can validate user inputs based on command schema and includes syntax and semantic checks on user provided values. The schema validator 1316 can take, as input, an in-memory bot structure and generates validation errors that it detects. The attribute code generator 1318 can generate attribute code, handles the nested nature of attributes, and transforms bot value types to Java language compatible types. The attribute code generator 1318 takes, as input, an in-memory bot structure and generates Java code within the bot class. A utility classes generator 1320 can generate utility classes which are used by an entry class or bot class methods. The utility classes generator 1320 can generate, as output, Java classes. A data type generator 1322 can generate value types useful at runtime. The data type generator 1322 can generate, as output, Java classes. An expression generator 1324 can evaluate user inputs and generates compatible Java code, identifies complex variable mixed user inputs, inject variable values, and transform mathematical expressions. The expression generator 1324 can take, as input, user defined values and generates, as output, Java compatible expressions.

The JAR generator 1328 can compile Java source files, produces byte code and packs everything in a single JAR, including other child bots and file dependencies. The JAR generator 1328 can take, as input, generated Java files, resource files used during the bot creation, bot compiler dependencies, and command packages, and then can generate a JAR artifact as an output. The JAR cache manager 1330 can put a bot JAR in cache repository so that recompilation can be avoided if the bot has not been modified since the last cache entry. The JAR cache manager 1330 can take, as input, a bot JAR.

In one or more embodiment described herein command action logic can be implemented by commands 1201 available at the control room 1008. This permits the execution environment on a device 1010 and/or 1015, such as exists in a user session 1018, to be agnostic to changes in the command action logic implemented by a bot 1004. In other words, the manner in which a command implemented by a bot 1004 operates need not be visible to the execution environment in which a bot 1004 operates. The execution environment is able to be independent of the command action logic of any commands implemented by bots 1004. The result is that changes in any commands 1201 supported by the RPA system 1000, or addition of new commands 1201 to the RPA system 1000, do not require an update of the execution environment on devices 1010, 1015. This avoids what can be a time and resource intensive process in which addition of a new command 1201 or change to any command 1201 requires an update to the execution environment to each device 1010, 1015 employed in an RPA system. Take, for example, a bot that employs a command 1201 that logs into an on-online service. The command 1201 upon execution takes a Uniform Resource Locator (URL), opens (or selects) a browser, retrieves credentials corresponding to a user on behalf of whom the bot is logging in as, and enters the user credentials (e.g., username and password) as specified. If the command 1201 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 14:
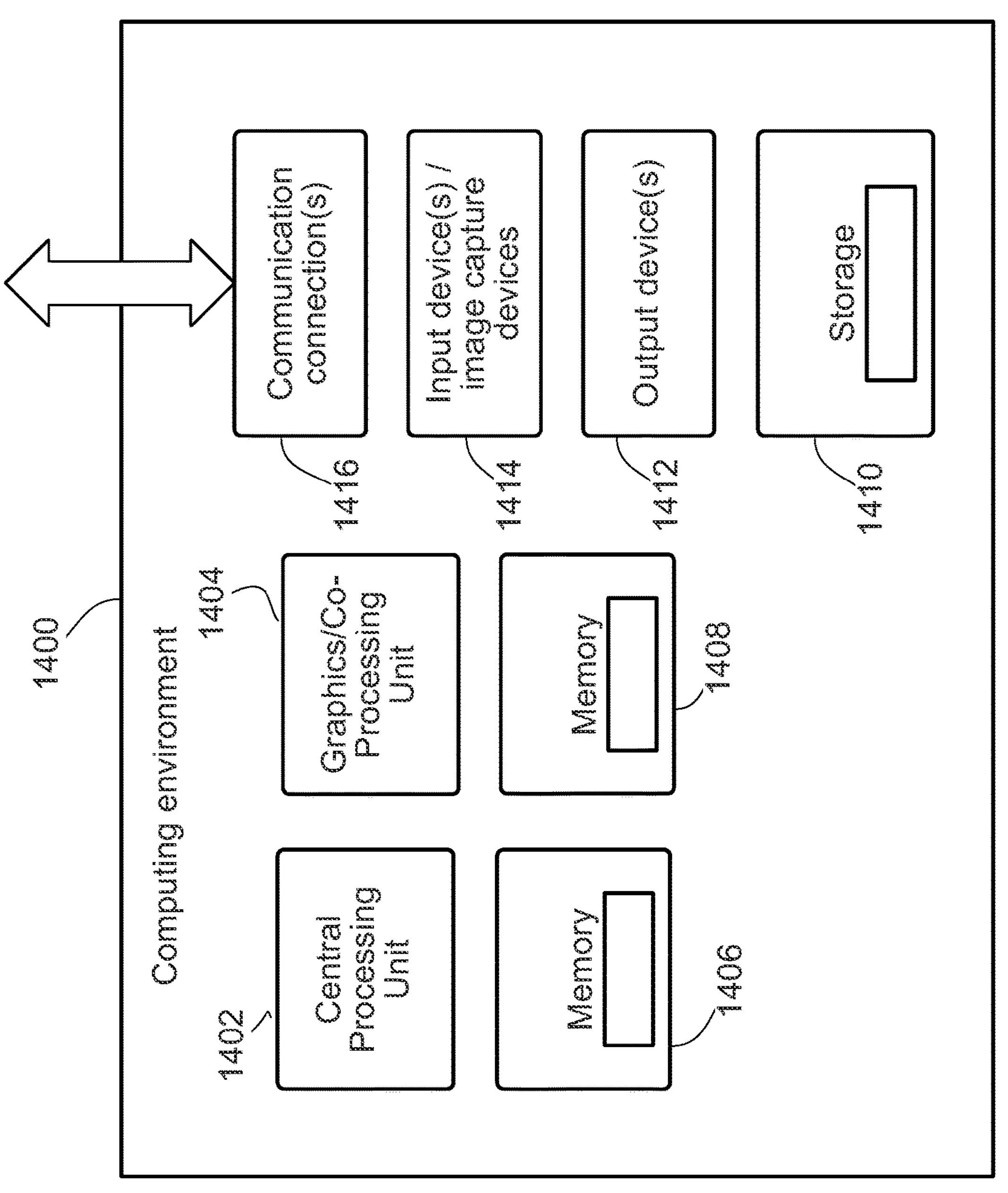
FIG. 14 illustrates a block diagram of an exemplary computing environment for an implementation of an RPA system, such as the RPA systems disclosed herein.

FIG. 14 illustrates a block diagram of an exemplary computing environment 1400 for an implementation of an RPA system, such as the RPA systems disclosed herein. The embodiments described herein may be implemented using the exemplary computing environment 1400. The exemplary computing environment 1400 includes one or more processing units 1402, 1404 and memory 1406, 1408. The processing units 1402, 1406 execute computer-executable instructions. Each of the processing units 1402, 1406 can be a general-purpose central processing unit (CPU), processor in an application-specific integrated circuit (ASIC) or any other type of processor. For example, as shown in FIG. 14, the processing unit 1402 can be a CPU, and the processing unit can be a graphics/co-processing unit (GPU). The tangible memory 1406, 1408 may be volatile memory (e.g., registers, cache, RAM), non-volatile memory (e.g., ROM, EEPROM, flash memory, etc.), or some combination of the two, accessible by the processing unit(s). In some embodiments may employ specialized hardware components to further increase the operating efficiency and speed with which the RPA system operates. The various components of exemplary computing environment 1400 may be rearranged in various embodiments, and some embodiments may not require nor include all of the above components, while other embodiments may include additional components, such as specialized processors and additional memory.

The exemplary computing environment 1400 may have additional features such as, for example, tangible storage 1410, one or more input devices 1414, one or more output devices 1412, and one or more communication connections 1416. An interconnection mechanism (not shown) such as a bus, controller, or network can interconnect the various components of the exemplary computing environment 1400. Typically, operating system software (not shown) provides an operating system for other software executing in the exemplary computing environment 1400, and coordinates activities of the various components of the exemplary computing environment 1400.

The tangible storage 1410 may be removable or non-removable, and includes magnetic disks, magnetic tapes or cassettes, CD-ROMs, DVDs, or any other medium which can be used to store information in a non-transitory way, and which can be accessed within the computing system 1400. The tangible storage 1410 can store instructions for the software implementing one or more features of an RPA system as described herein.

The input device(s) or image capture device(s) 1414 may include, for example, one or more of a touch input device such as a keyboard, mouse, pen, or trackball, a voice input device, a scanning device, an imaging sensor, touch surface, or any other device capable of providing input to the exemplary computing environment 1400. For multimedia embodiment, the input device(s) 1414 can, for example, include a camera, a video card, a TV tuner card, or similar device that accepts video input in analog or digital form, a microphone, an audio card, or a CD-ROM or CD-RW that reads audio/video samples into the exemplary computing environment 1400. The output device(s) 1412 can, for example, include a display, a printer, a speaker, a CD-writer, or any another device that provides output from the exemplary computing environment 1400.

The one or more communication connections 1416 can enable communication over a communication medium to another computing entity. The communication medium conveys information such as computer-executable instructions, audio or video input or output, or other data. The communication medium can include a wireless medium, a wired medium, or a combination thereof.

This application also references (i) U.S. patent application Ser. No. 17/389,300 filed Jul. 29, 2021, entitled "REPEATING PATTERN DETECTION WITHIN USAGE RECORDINGS OF ROBOTIC PROCESS AUTOMATION TO FACILITATE REPRESENTATION THEREOF," which is expressly incorporated by reference herein; and (ii) U.S. patent application Ser. No. 17/389,304 filed Jul. 29, 2021, entitled "ROBOTIC PROCESS AUTOMATION SUPPORTING HIERARCHICAL REPRESENTATION OF RECORDINGS," which is expressly incorporated by reference herein. Additional details and description of examining recordings, such that recordings can be organized and/or rendered in a consolidated manner, are described in these incorporated applications. Also, additional details and description of recognizing and represent repetitive tasks within multiple recordings as multi-level patterns of steps, sub-tasks, or some combinations thereof, are described in these incorporated applications. The multi-level arranged recordings can be used to form a hierarchical representation of the recordings so that users can better understand and visualize what tasks or sub-tasks are being carried out at each portion of the recordings. The RPA system can identify patterns within recordings that often repeat and can define patterns to facilitate locating such patterns within recordings and can also accommodate variants in such patterns. By doing so, an RPA system can better understand and visualize how or what software robots can be created to automate the same sub-tasks or tasks, and thus facilitate creation of software robots to automate the same tasks or sub-tasks.

This application also references U.S. patent application Ser. No. 17/096,908, filed Nov. 12, 2020, entitled "AUTOMATED SOFTWARE ROBOT CREATION FOR ROBOTIC PROCESS AUTOMATION", which is expressly incorporated by reference herein. Additional details and description of processing of recordings, merging recordings, and producing software automation robots are described in this incorporated U.S. patent application Ser. No. 17/096,908.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for locating matching steps or sequences within recordings of user-initiated events with one or more application programs, the recordings being associated with by a robotic process automation system, the method comprising:

identifying a set of steps to be located within the recordings;

retrieving, for each of the steps, a base digital fingerprint, the base digital fingerprint being previously derived from encodings of attributes associated with the corresponding step;

determining, for at least one of the steps, at least a portion of one or more of the attributes associated with the base digital fingerprint that are to be excluded from the base digital fingerprint;

modifying the base digital fingerprint for the at least one of the steps to exclude the at least a portion of one or more encodings of the attributes associated with the base digital fingerprint that are to be excluded from the base digital fingerprint, the modifying of the base digital fingerprint producing a modified digital fingerprint for the at least one of the steps; and searching the recordings to locate matching steps or sequences within the recordings, the searching being based on the modified digital fingerprint for the at least one of the steps.

2. A computer-implemented method as recited in claim 1, wherein the modifying the base digital fingerprint to produce the modified digital fingerprint comprises:

masking out consideration of the at least a portion of one or more encodings of the attributes associated with the base digital fingerprint that are to be excluded from the base digital fingerprint.

3. A computer-implemented method as recited in claim 2, wherein the masking out consideration the at least a portion of one or more encodings of the attributes associated with the base digital fingerprint that are to be excluded from the base digital fingerprint replaces an encoding for the portion of one or more of the encodings of the attributes associated with the base digital fingerprint that are to be excluded with a predetermined value.

4. A computer-implemented method as recited in claim 3, wherein the encodings for the attributes are hexadecimal values, and wherein the predetermined value is a predetermined hexadecimal value.

5. A computer-implemented method for providing digital fingerprints for steps in a recording of user-initiated events with one or more application programs, at least a portion of the recording being used in by a robotic process automation system, the method comprising:

identifying a step in the recording to be provided with a digital fingerprint, the step having a plurality of attributes associated therewith;

determining a subset of the attributes associated with the step that are to be utilized in producing the digital fingerprint;

encoding each of the attributes in the subset of the attributes determining at least a portion of one or more of the attributes in the subset of the attributes to be ignored; and generating a digital fingerprint for the step in the recording based on the encodings for the attributes in the subset of the attributes other than the at least a portion of one of the attributes in the subset of the attributes to be ignored.

6. A computer-implemented method as recited in claim 5, wherein the generating of the digital fingerprint comprises:

concatenating the encodings for each of the attributes in the subset of attributes other than the at least a portion of one of the attributes in the subset of the attributes to be ignored.

7. A computer-implemented method as recited in claim 5, wherein the encodings for each of the attributes in the subset of attributes are hexadecimal values.

8. A computer-implemented method as recited in claim 7, wherein, in the concatenating of the encodings, the encoding for the at least a portion of the attributes in the subset of attributes in the subset of the attributes to be ignored is replaced with a predetermined hexadecimal value.

9. A computer-implemented method as recited in claim 8, wherein the predetermined hexadecimal value is a zero.

10. A computer-implemented method as recited in claim 5, wherein the method comprises:

searching the recordings to locate matching steps or sequences within the recordings, the searching being based on the modified digital fingerprint for the at least one of the steps.

11. A computer-implemented method as recited in claim 5, wherein the generating of the digital fingerprint comprises:

masking out consideration of the determined at least a portion of one or more of the encodings for the one or more attributes in the subset of attributes to be ignored.

12. A computer-implemented method as recited in claim 5, wherein the method comprises:

receiving, from a requestor, a request for the digital fingerprint, the request including an indication of the at least a portion of one or more of the encodings to be ignored; and returning the digital fingerprint that has been generated to the requestor.

13. A computer-implemented method as recited in claim 5, wherein the method comprises:

determining an encoding type for each of the attributes in the subset of the attributes, wherein the encoding of each of the attributes in the subset of the attributes uses the determined encoding type for each of the attributes in the subset of the attributes.

14. A Robotic Process Automation (RPA) system, comprising:

an RPA server configured to support sequence mining of a plurality of recordings to identify repeating sequences as candidates for creation of at least one software processing agent, the at least one software processing agent pertaining to a series of user-initiated events with one or more software programs operating on one or more computing devices, the RPA server comprising:

a digital fingerprint subsystem configures to generate a digital fingerprint for a step of a selected recording of the plurality of recordings;

a step matching subsystem configures to identify matching steps in different ones of the recordings based on the respective digital fingerprints; and a sequence mining subsystem configured to evaluate a plurality of the matching steps in the recordings to identify at least one repeating sequence, wherein the digital fingerprint subsystem is further configured to at least:

determine a subset of attributes associated with the step that are to be utilized in generating the digital fingerprint; and generate the digital fingerprint for the step in the recording based on at least a plurality of the attributes in the subset of attributes, and wherein the digital fingerprint subsystem, the step matching subsystem or the sequence mining subsystem is further configured to at least:

modify the digital fingerprint for the step in the recording to facilitate sequence mining by the sequence mining subsystem.

15. An RPA system as recited in claim 14, wherein the digital fingerprint is modified in a manner that is dependent on the at least one repeating sequence being searched for by the sequence mining subsystem.

16. An RPA system as recited in claim 14, wherein the digital fingerprint is modified to relax the digital fingerprint, such that the modified digital fingerprint is easier to be matched with during sequence mining by the sequence mining subsystem.

17. An RPA system as recited in claim 14, wherein the digital fingerprint subsystem generates the digital fingerprint for the step by being configured to at least:

determine an encoding type for each of the attributes in the subset of attributes; and determine an encoding each of the attributes in the subset of attributes using the determined encoding type for each of the attributes in the subset of attributes.

18. An RPA system as recited in claim 17, wherein the digital fingerprint subsystem generates the digital fingerprint for the step based on the encodings for each of the attributes in the subset of attributes.

19. An RPA system as recited in claim 18, wherein the digital fingerprint subsystem generates the digital fingerprint for the step by concatenating the encodings for each of the attributes in the subset of attributes.

20. An RPA system as recited in claim 14, wherein the digital fingerprint subsystem is configurable to determine the subset of attributes to be used, configurable to determine an encoding type to be performed for each of the attributes in the subset of attributes to be used.

21. An RPA system as recited in claim 14, wherein the RPA server comprises:

a software automation process generation subsystem configured to generate a software automation process to carry out in an automated manner the at least one repeating sequence that has been identified or searched for by the sequence mining system.

22. A non-transitory computer readable medium including at least computer program code tangibly stored therein for locating matching steps or sequences within recordings of user-initiated events with one or more application programs, the recordings being associated with a robotic process automation system, the computer readable medium comprising:

computer program code for determining a subset of attributes associated with a given step in a sequence of steps that is to be located in one of more of the recordings that are to be utilized in generating the digital fingerprint;

computer program code for generating the digital fingerprint for the given step in the sequence of steps based on the determined subset of attributes;

computer program code for determining whether to attempt to locate the sequence of steps in the recordings;

computer program code for modifying the digital fingerprint for the given step to alter the digital fingerprint such that a matching sequence with the recordings is easier to be found; and computer program code for attempting to locate the sequence of steps in the recordings if the computer program code for determining determines that it is to be attempted to locate the sequence of steps in the recordings, the attempt to locate being based on at least the modified digital fingerprint for the given step.

* * * * *